(12) United States Patent
Baek et al.

(10) Patent No.: US 11,800,599 B2
(45) Date of Patent: Oct. 24, 2023

(54) METHOD FOR DISCOVERING AND SELECTING RELAY USER EQUIPMENT IN COMMUNICATION SYSTEM

(71) Applicant: ELECTRONICS AND TELECOMMUNICATIONS RESEARCH INSTITUTE, Daejeon (KR)

(72) Inventors: Seung Kwon Baek, Daejeon (KR); Jae Su Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 127 days.

(21) Appl. No.: 17/212,128

(22) Filed: Mar. 25, 2021

(65) Prior Publication Data

US 2021/0315057 A1 Oct. 7, 2021

(30) Foreign Application Priority Data

Apr. 3, 2020 (KR) .......................... 10-2020-0040984
Apr. 21, 2020 (KR) .......................... 10-2020-0048359
(Continued)

(51) Int. Cl.
*H04W 88/04* (2009.01)
*H04W 8/00* (2009.01)
(Continued)

(52) U.S. Cl.
CPC ........... *H04W 88/04* (2013.01); *H04W 8/005* (2013.01); *H04W 76/10* (2018.02); *H04W 92/18* (2013.01)

(58) Field of Classification Search
CPC ..... H04W 88/04; H04W 8/005; H04W 76/10; H04W 92/18; H04W 76/14
See application file for complete search history.

(56) References Cited

U.S. PATENT DOCUMENTS

2012/0224472 A1 9/2012 Kim et al.
2015/0036578 A1* 2/2015 Wu .......................... H04W 4/80
370/312
(Continued)

FOREIGN PATENT DOCUMENTS

WO 2013162345 A1 10/2013
WO 2014063091 A1 4/2014
(Continued)

OTHER PUBLICATIONS

Oppo, "New SID: Study on NR sidelink relay", 3GPP TSG RAN Meeting #86, RP-193253, Sitges, Spain, Dec. 9-12, 2019.

*Primary Examiner* — Michael K Phillips
(74) *Attorney, Agent, or Firm* — LRK PATENT LAW FIRM

(57) ABSTRACT

An operation method performed by a remote terminal in a communication system includes: receiving a discovery signal from each of one or more neighboring terminals; performing a measurement operation on the discovery signal; determining at least one candidate terminal from among the one or more neighboring terminals based on a result of the measurement operation; selecting a relay terminal within the at least one candidate terminal; and performing a sidelink setup procedure with the relay terminal.

14 Claims, 21 Drawing Sheets

(30) Foreign Application Priority Data

| | | | |
|---|---|---|---|
| May 11, 2020 | (KR) | ........................ | 10-2020-0056103 |
| Sep. 1, 2020 | (KR) | ........................ | 10-2020-0111106 |
| Oct. 13, 2020 | (KR) | ........................ | 10-2020-0131996 |
| Mar. 3, 2021 | (KR) | ........................ | 10-2021-0028410 |
| Mar. 9, 2021 | (KR) | ........................ | 10-2021-0030658 |

(51) Int. Cl.
*H04W 76/10* (2018.01)
*H04W 92/18* (2009.01)

(56) References Cited

U.S. PATENT DOCUMENTS

| | | | | |
|---|---|---|---|---|
| 2015/0038136 | A1* | 2/2015 | Wu | H04W 48/08 |
| | | | | 455/434 |
| 2015/0045033 | A1 | 2/2015 | Kim et al. | |
| 2015/0085791 | A1* | 3/2015 | Baghel | H04W 76/14 |
| | | | | 370/329 |
| 2015/0119056 | A1 | 4/2015 | Lee et al. | |
| 2015/0230180 | A1 | 8/2015 | Lim et al. | |
| 2015/0334555 | A1* | 11/2015 | Seo | H04W 8/186 |
| | | | | 370/254 |
| 2016/0037568 | A1* | 2/2016 | Hakola | H04W 72/085 |
| | | | | 370/329 |
| 2016/0227495 | A1* | 8/2016 | Lee | H04L 5/0048 |
| 2017/0244469 | A1* | 8/2017 | Seo | H04W 68/02 |
| 2017/0295585 | A1* | 10/2017 | Sorrentino | H04W 76/14 |
| 2017/0366958 | A1 | 12/2017 | Ryu et al. | |
| 2018/0069618 | A1* | 3/2018 | Loehr | H04W 88/04 |
| 2018/0115362 | A1* | 4/2018 | Yasukawa | H04B 7/15507 |
| 2018/0139694 | A1* | 5/2018 | Folke | H04W 76/14 |
| 2018/0152986 | A1* | 5/2018 | Jung | H04W 48/20 |
| 2018/0249516 | A1* | 8/2018 | Jung | H04W 76/10 |
| 2019/0037463 | A1 | 1/2019 | Feng | |
| 2019/0313315 | A1* | 10/2019 | Xu | H04W 36/30 |
| 2021/0185757 | A1* | 6/2021 | Purkayastha | H04W 76/14 |
| 2022/0322283 | A1* | 10/2022 | Ji | H04W 76/14 |
| 2022/0353799 | A1* | 11/2022 | Talebi Fard | H04W 8/005 |

FOREIGN PATENT DOCUMENTS

| | | | | |
|---|---|---|---|---|
| WO | 2015030557 | A1 | 3/2015 | |
| WO | 2016024773 | A1 | 2/2016 | |
| WO | 2016163767 | A1 | 10/2016 | |
| WO | 2019059649 | A1 | 3/2019 | |
| WO | WO-2021104680 | A1 * | 6/2021 | ........... H04B 7/0617 |

* cited by examiner

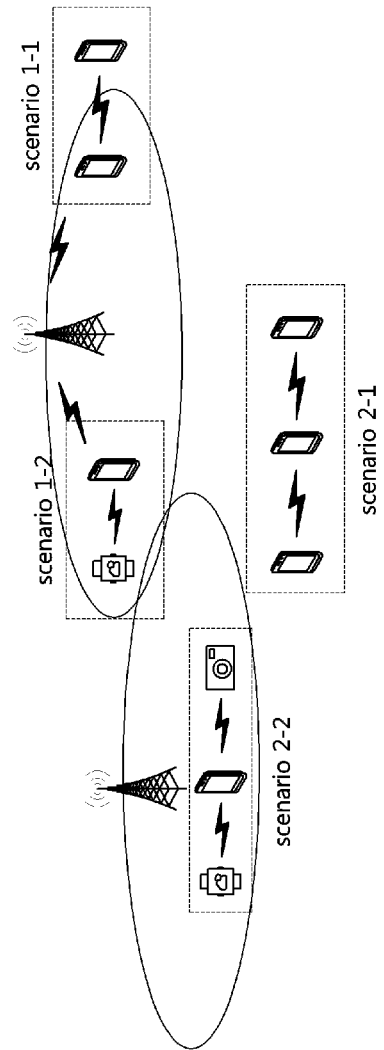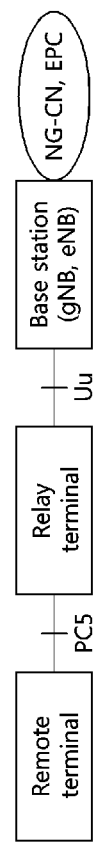

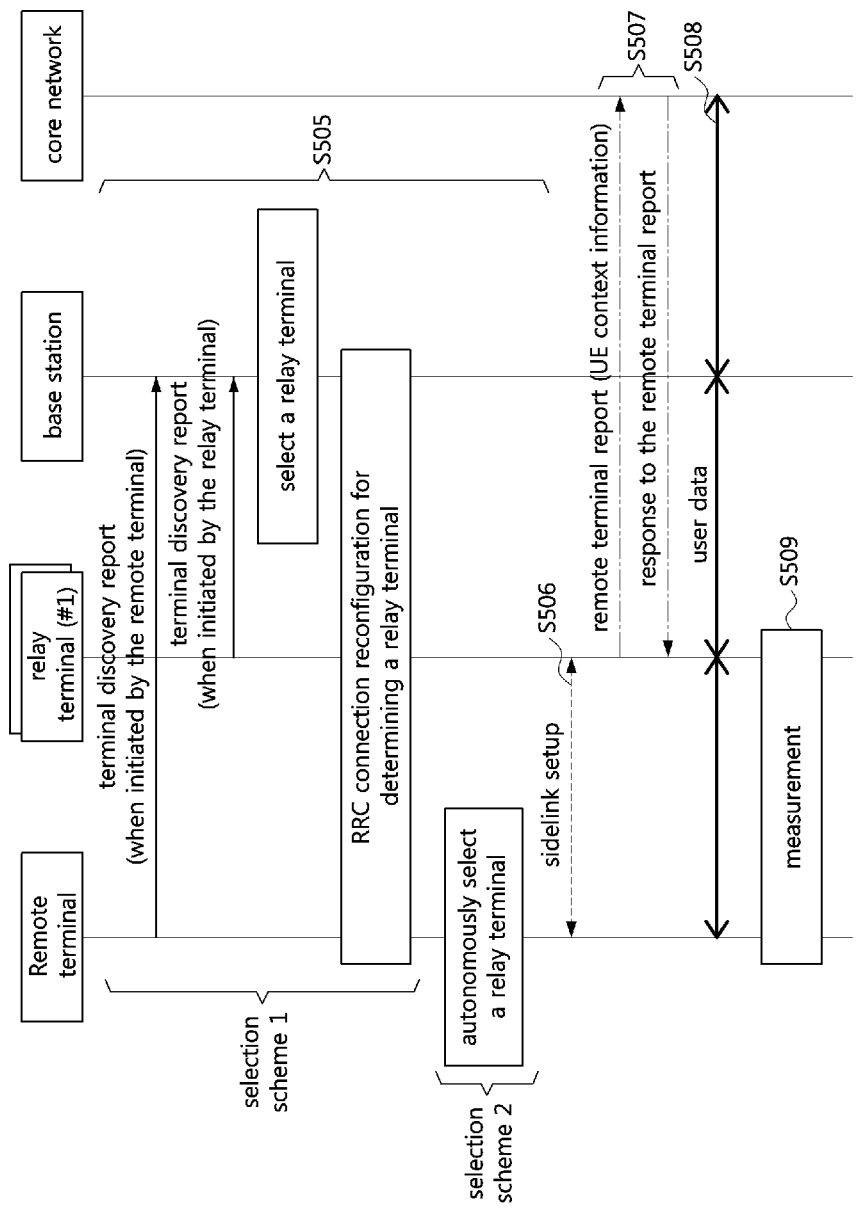

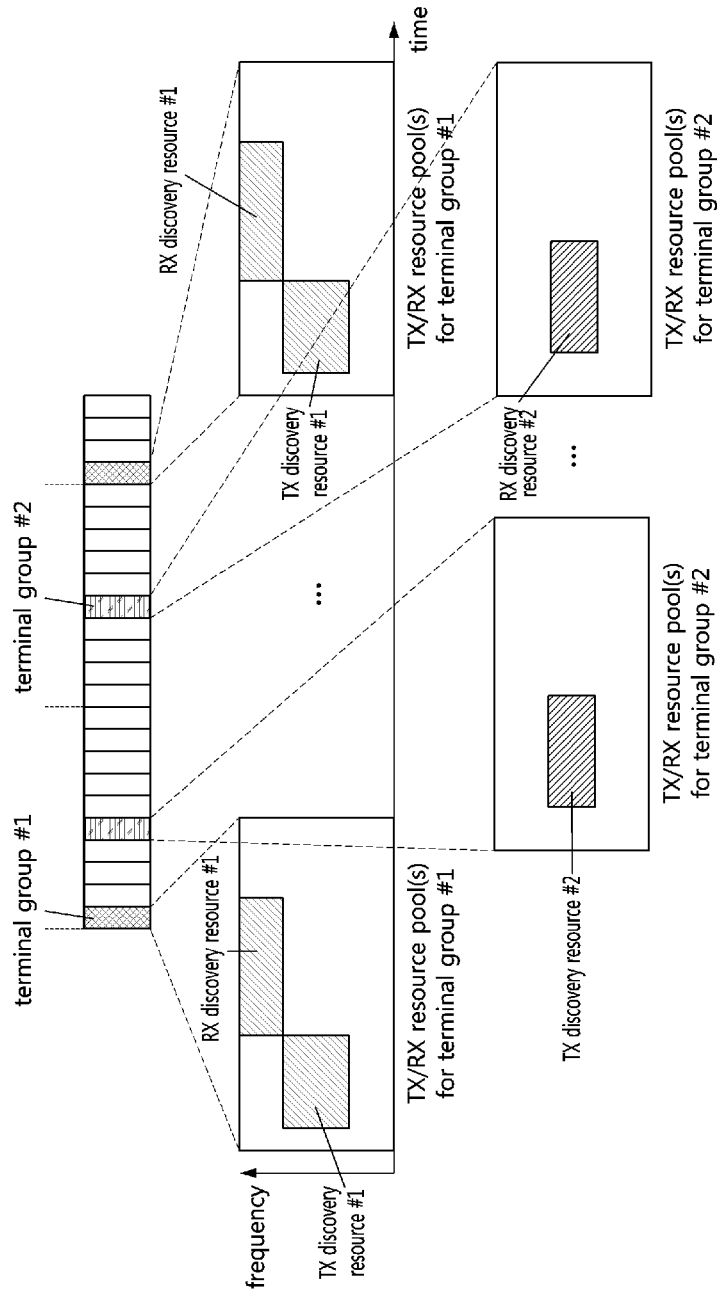

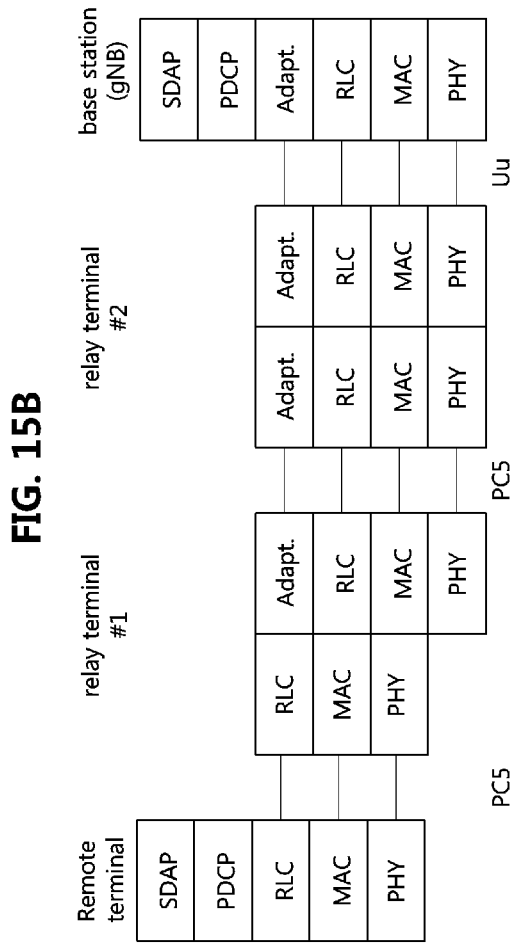

METHOD FOR DISCOVERING AND SELECTING RELAY USER EQUIPMENT IN COMMUNICATION SYSTEM

CROSS-REFERENCE TO RELATED APPLICATIONS

This application claims priority to Korean Patent Applications No. 10-2020-0040984 filed on Apr. 3, 2020, No. 10-2020-0048359 filed on Apr. 21, 2020, No. 10-2020-0056103 filed on May 11, 2020, No. 10-2020-0111106 filed on Sep. 1, 2020, No. 10-2020-0131996 filed on Oct. 13, 2020, No. 10-2021-0028410 filed on Mar. 3, 2021, and No. 10-2021-0030658 filed on Mar. 9, 2021 with the Korean Intellectual Property Office (KIPO), the entire contents of which are hereby incorporated by reference.

BACKGROUND

1. Technical Field

The present disclosure relates to a relay communication technique for a communication system, and more specifically, to a technique for discovering and selecting a relay terminal for service coverage extension.

2. Description of Related Art

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The NR communication system may support not only a frequency band of 6 GHz or below, but also a frequency band of 6 GHz or above, and may support various communication services and scenarios compared to the LTE communication system. For example, usage scenarios of the NR communication system may include enhanced Mobile BroadBand (eMBB), Ultra Reliable Low Latency Communication (URLLC), and Massive Machine Type Communication (mMTC). In this reason, communication technologies for satisfying the requirements of eMBB, URLLC, and mMTC are required.

The communication system (e.g., LTE communication system and/or NR communication system) may support Internet of Things (IoT) technologies. Accordingly, various smart devices (e.g., smart watch, wireless earphone, head mounted display (HMD), etc.) are used. The above-described devices (e.g., smart devices) may provide various services by using an application operated based on proximity to nearby devices. In order to provide a proximity service, technologies for direct communications between terminals have been developed for technologies for increasing the efficiency of network resources, technologies for reducing power consumption of terminals, technologies for extending cellular communication coverage, and the like. Relay communication between terminals may be used to extend a service coverage. In this case, methods of discovering and/or selecting a relay terminal may be required.

SUMMARY

Accordingly, exemplary embodiments of the present disclosure are directed to providing methods for discovering and selecting a relay terminal in a communication system.

According to a first exemplary embodiment of the present disclosure, an operation method, performed by a remote terminal in a communication system, may comprise: receiving a discovery signal from each of one or more neighboring terminals; performing a measurement operation on the discovery signal; determining at least one candidate terminal from among the one or more neighboring terminals based on a result of the measurement operation; selecting a relay terminal within the at least one candidate terminal; and performing a sidelink setup procedure with the relay terminal.

The operation method may further comprise: transitioning an operating state of the remote terminal to a sidelink (SD) connected state when the sidelink setup procedure is completed; and performing sidelink communication with the relay terminal.

The operation method may further comprise receiving configuration information for discovery and selection of the relay terminal from a base station.

The configuration information may include one or more of configuration information for a beam sweeping operation, configuration information of a resource pool for a discovery operation, configuration information of a frequency for the discovery operation, configuration information of a public land mobile network (PLMN) for the discovery operation, and configuration information for the measurement operation.

The operation method may further comprise performing a beam sweeping operation with the one or more neighboring terminals, wherein the discovery signal is received through a beam configured in the beam sweeping operation.

The discovery signal may include information indicating whether each of the one or more neighboring terminals supports a relay function.

The discovery signal may be one or more of a demodulation reference signal (DMRS), a sidelink discovery-reference signal (SD-RS), and a synchronization signal.

The operation method may further comprise transmitting a response signal to the discovery signal to the one or more neighboring terminals.

According to a second exemplary embodiment of the present disclosure, an operation method, performed by a remote terminal in a communication system, may comprise: receiving a discovery signal from each of one or more neighboring terminals; performing a measurement operation on the discovery signal; determining at least one candidate terminal from among the one or more neighboring terminals based on a result of the measurement operation; transmitting a list including information of the at least one candidate terminal to a base station; and receiving information on a relay terminal selected within the at least one candidate terminal included in the list from the base station.

The operation method may further comprise: performing a sidelink setup procedure with the relay terminal selected by the base station; transitioning an operating state of the remote terminal to a sidelink (SD) connected state when the sidelink setup procedure is completed; and performing sidelink communication with the relay terminal.

The information of the relay terminal may be included in a radio resource control (RRC) connection reconfiguration message transmitted from the base station.

The operation method may further comprise receiving configuration information for discovery and selection of the relay terminal from the base station, wherein the configuration information may include one or more of configuration information for a beam sweeping operation, configuration information of a resource pool for a discovery operation, configuration information of a frequency for the discovery operation, configuration information of a public land mobile network (PLMN) for the discovery operation, and configuration information for the measurement operation.

The operation method may further comprise performing a beam sweeping operation with the one or more neighboring terminals, wherein the discovery signal is received through a beam configured in the beam sweeping operation.

The discovery signal may include information indicating whether each of the one or more neighboring terminals supports a relay function, and the discovery signal may be one or more of a demodulation reference signal (DMRS), a sidelink discovery-reference signal (SD-RS), and a synchronization signal.

According to a third exemplary embodiment of the present disclosure, an operation method, performed by a relay terminal in a communication system, may comprise: configuring a resource for sidelink discovery with a base station; transmitting a discovery signal to a remote terminal; transmitting a list including information on at least one candidate terminal determined based on a measurement result of the discovery signal to the base station; and when the relay terminal is selected as a final relay terminal from the at least one candidate terminal, performing a sidelink setup procedure with the remote terminal.

The operation method may further comprise receiving configuration information for discovery and selection of the relay terminal from the base station.

The configuration information may include one or more of configuration information for a beam sweeping operation, configuration information of a resource pool for a discovery operation, configuration information of a frequency for the discovery operation, configuration information of a public land mobile network (PLMN) for the discovery operation, and configuration information for a measurement operation.

The operation method may further comprise performing a beam sweeping operation with the remote terminal, wherein the discovery signal is received through a beam configured in the beam sweeping operation.

The discovery signal may include information indicating whether the relay terminal supports a relay function.

The discovery signal may be one or more of a demodulation reference signal (DMRS), a sidelink discovery-reference signal (SD-RS), and a synchronization signal.

According to the exemplary embodiments of the present disclosure, configuration information for a relay discovery/selection operation may be made by a base station, and a relay terminal and a remote terminal may perform the relay discovery/selection operation based on the configuration information. Based on a result of the relay discovery/selection operation, a sidelink may be configured between the relay terminal and the remote terminal, and the relay terminal may relay communications between the base station and the remote terminal. Accordingly, a service coverage (e.g., cell coverage) of the base station may be improved, and performance of the communication system may be improved.

In addition, the remote terminal may transmit and receive data to and from the base station using an access link or a sidelink. Based on a measurement result of the remote terminal, a switching operation from the access link to the sidelink, a switching operation from the sidelink to the access link, or a switching operation from a first sidelink to a second sidelink may be performed. Accordingly, a quality of service (QoS) of the communication service can be guaranteed, and continuity of the communication service can be guaranteed.

BRIEF DESCRIPTION OF DRAWINGS

FIG. 3 is a conceptual diagram illustrating scenarios for service coverage extension in a communication system.

FIG. 4 is a block diagram illustrating a first exemplary embodiment of a structure of a communication system for relay communication.

FIGS. 5A and 5B are sequence charts illustrating a first exemplary embodiment of a relay discovery/selection method.

FIG. 8 is a conceptual diagram illustrating a second exemplary embodiment of a resource pool for transmission and reception of discovery messages.

FIG. 15B is a block diagram illustrating a second exemplary embodiment of user plane protocols in a relay communication system.

DETAILED DESCRIPTION OF THE EMBODIMENTS

Figure 1:
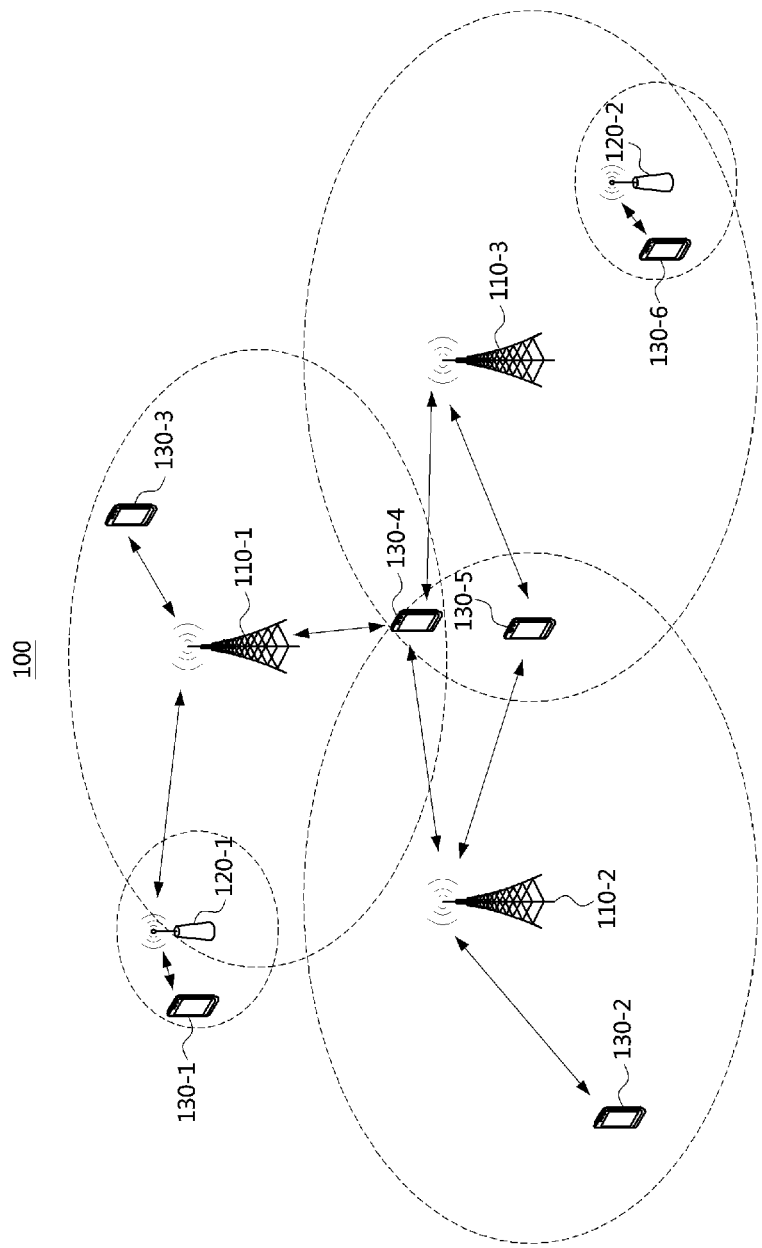
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

A communication system to which exemplary embodiments according to the present disclosure are applied will be described. The communication system may be a 4G communication system (e.g., a long-term evolution (LTE) communication system, an LTE-A communication system), a 5G communication system (e.g., a new radio (NR) communication system), or the like. The 4G communication system can support communication in a frequency band of 6 GHz or below, and the 5G communication system can support communication in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used with the same meaning as a communication network, 'LTE' may refer to '4G communication system', 'LTE communication system' or 'LTE-Advanced (LTE-A) communication system', and 'NR' may refer to '5G communication system' or 'NR communication system'.

FIG. 1 is a conceptual diagram illustrating a first exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., new radio (NR) system), the core network may include an access and mobility management function (AMF), a user plane function (UPF), a session management function (SMF), and the like.

The plurality of communication nodes 110 to 130 may support a communication protocol defined by the 3rd generation partnership project (3GPP) specifications (e.g., LTE communication protocol, LTE-A communication protocol, NR communication protocol, or the like). The plurality of communication nodes 110 to 130 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
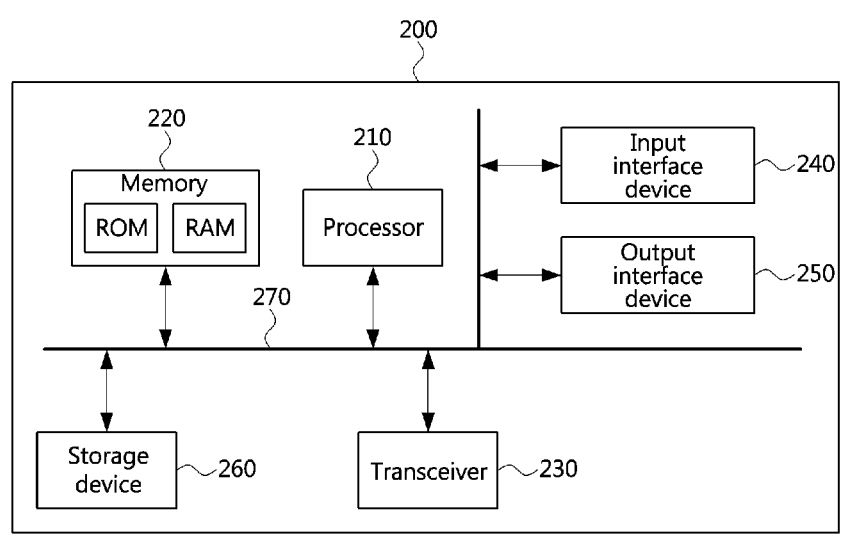
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Sidelink communication may refer to direct communication between terminals. When sidelink communication is performed, the following effects of extending a service coverage may occur.

UE-to-Network Coverage Extension

'UE-to-network coverage extension' refers to extension of a coverage of an access link (e.g., Uu interface) between a base station and a terminal for communications between the terminal (e.g., UE) located inside or outside of a cell coverage and the entity (e.g., base station) located in the network. The cell coverage may refer to a service coverage (e.g., communication coverage) provided by the base station.

UE-to-UE Coverage Extension

'UE-to-UE coverage extension' refers to extension of a coverage of a sidelink (e.g., PC5 interface) between terminals for communications between the terminals (e.g., entities) located inside or outside of a cell coverage.

FIG. 3 is a conceptual diagram illustrating scenarios for service coverage extension in a communication system.

As shown in FIG. 3, a service coverage (e.g., cell coverage, communication coverage) may be extended using a relay terminal. In exemplary embodiments, a relay terminal may refer to a relay UE, a remote terminal may refer to a remote UE, and a network may refer to a base station.

UE-to-Network Relay Scenario

'UE-to-network relay scenario' may include a scenario 1-1 and a scenario 1-2. In the scenario 1-1, a relay terminal may be located inside a cell coverage, a remote terminal may be located outside the cell coverage, information exchange between the remote terminal and a network (e.g., base station) may be performed through the relay terminal, and services may be provided according to the above-described operations. In the scenario 1-2, a relay terminal and a remote terminal may be located inside a cell coverage, information exchange between the remote terminal and a network may be performed through the relay terminal, and services may be provided according to the above-described operations.

In the UE-to-network relay scenario, when the remote terminal performs communication with the network, the relay terminal may serve as a relay node providing a connection between the remote terminal and the network. In this case, the relay terminal may be located inside a service coverage of a cell provided by the base station, and the remote terminal may be located inside or outside the service coverage of the cell provided by the base station.

UE-to-UE Relay Scenario

'UE-to-UE relay scenario' may include a scenario 2-1 and a scenario 2-2. In the scenario 2-1, a relay terminal and a remote terminal may be located outside of a cell coverage, and services may be provided through information exchange between the terminals (e.g., relay terminal and remote terminal). In the scenario 2-2, a relay terminal and a remote terminal may be located inside a cell coverage, and services may be provided through information exchange between the terminals (e.g., relay terminal and remote terminal). When relay communication between the terminals is performed, the relay terminal may serve as a relay node providing a connection between remote terminals. In this case, the relay terminal may be located inside or outside a service coverage of a cell, and the remote terminal may be located inside or outside the service coverage of the cell.

In the following exemplary embodiments, methods of discovering and/or selecting a relay terminal for relay communication (e.g., relay communication between a terminal and a network, relay communication between terminals) will be described. The method of discovering and/or selecting a relay terminal' may be referred to as a 'relay discovery/selection method (e.g., relay discovery/selection operation)'.

FIG. 4 is a block diagram illustrating a first exemplary embodiment of a structure of a communication system for relay communication.

As shown in FIG. 4, a remote terminal and a relay terminal may perform sidelink communication based on a PC5 (e.g., PC5 interface, sidelink), and the relay terminal and a base station may perform communication based a Uu (e.g., Uu interface, access link). In exemplary embodiments, the base station may refer to an eNB or a gNB. Each of the next generation-convergence network (NG-CN) and the evolved packet core (EPC) may include functional node(s). Each of the NG-CN and EPC may be referred to as a core network. The functional node(s) may be an MME, S-GW, P-GW, AMF, UPF, and the like. The functional node may mean a functional entity.

Figure 5A:
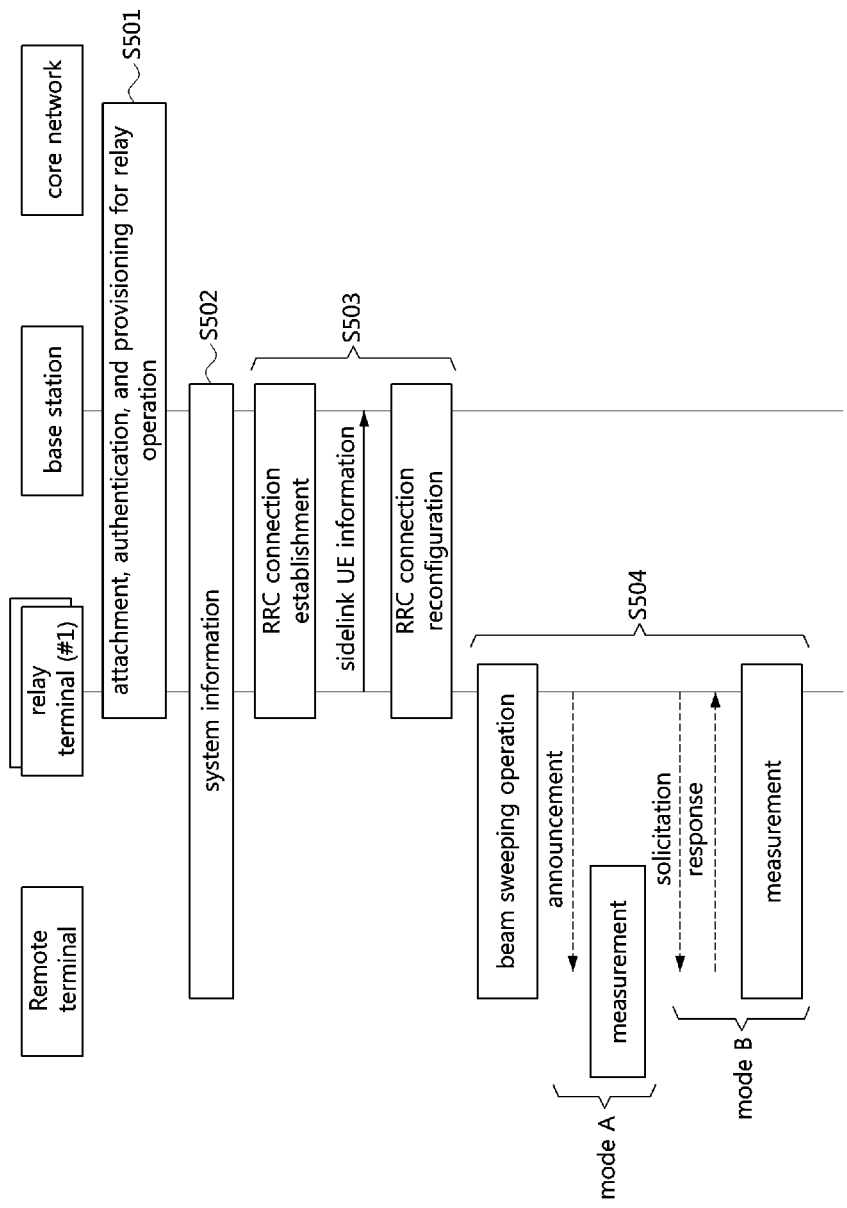

FIGS. 5A and 5B are sequence charts illustrating a first exemplary embodiment of a relay discovery/selection method.

As shown in FIGS. 5A and 5B, a relay terminal may perform a registration and/or authentication procedure with functional node(s) of a core network (e.g., NG-CN or EPC) by performing an attachment procedure (S501). The functional node(s) may be an MME, S-GW, P-GW, AMF, UPF, and the like. When the step S501 is performed, the relay terminal may perform a control procedure with the MME for a relay operation.

The base station may transmit system information in a broadcast manner (S502), and each of the remote terminal and the relay terminal may receive the system information from the base station. A configuration procedure for a relay discovery/selection operation and/or communication (e.g., sidelink communication, relay communication) may be performed based on the system information. For example, the relay terminal may perform a resource configuration procedure for the relay discovery/selection operation and/or communication (S503). The relay discovery/selection operation may also be referred to as a 'sidelink discovery operation'. The relay terminal and the remote terminal may perform a beam-based measurement procedure (S504). The relay terminal and the remote terminal may perform communications (e.g., step S504) using an ultra-high frequency band (e.g., mmWave band). The relay terminal and the remote terminal may perform a configuration procedure for a beam sweeping operation.

The system information broadcasted by the base station for discovery of a relay terminal may include one or more information elements described in Tables 1 to 4 below. Configuration information for a beam sweeping operation defined in Table 1 may be configured for ultra-high frequency band communication.

TABLE 1

Configuration information for beam sweeping operation

| | |
|---|---|
| Beam sweeping resource configuration information | 'Beam sweeping resource configuration information' may be resource information (e.g., transmission resource information) for a transmission beam and a reception beam (e.g., reception direction) for beam discovery. |

TABLE 1-continued

Configuration information for beam sweeping operation

| | |
|---|---|
| Measurement object information | 'Measurement object information' may be a measurement object signal for beam sweeping. Beam sweeping may be used for transmission and/or communication of discovery messages (e.g., discovery signals) between terminals. A synchronization signal (e.g., synchronization signal (SS), SS block (SSB), SS/PBCH block, etc.) and/or a reference signal (e.g., channel state information-reference signal (CSI-RS), demodulation signal reference signal (DMRS), sounding reference signal (SRS), etc.) may be configured for measurement. The measurement object signal may be configured such that beam identification information (e.g., beam index) can be derived therefrom. |
| Beam selection threshold | 'Beam selection threshold' may be a minimum threshold required for beam selection when beam sweeping is performed based on a measurement object signal. |

TABLE 2

Configuration information of a resource pool for terminal discovery operation

| | |
|---|---|
| Discovery RX pool and frequency | 'Discovery RX pool and frequency' may indicate a resource pool and/or a frequency for receiving a discovery message. |
| Discovery TX pool and frequency | 'Discovery TX pool and frequency' may indicate a resource pool and/or a frequency for transmitting a discovery message. |
| Configuration of a resource pool for discovery of a relay terminal | 'Configuration of a resource pool for discovery of a relay terminal' may indicate configuration (e.g., configuration scheme) of a resource pool for transmitting and receiving a relay terminal discovery message. Here, the resource pool may be a shared resource pool and/or a dedicated resource pool. |

TABLE 3

Configuration information of a frequency and a public land mobile network (PLMN) for terminal discovery operation

| | |
|---|---|
| Frequency list for inter-frequency discovery | 'Frequency list for inter-frequency discovery' may be information on a list of frequencies for inter-frequency discovery. |
| PLMN identifier list | 'PLMN identifier list' may be information on a list of PLMN identifier(s) discoverable. |

TABLE 4

Measurement control information for terminal discovery operation (i.e., configuration for measurement operation)

| | | |
|---|---|---|
| Measurement object information | | 'Measurement object information' may indicate a measurement target signal for terminal discovery. The measurement target signal (e.g., signal configurable for measurement) may be a reference signal (e.g., a DMRS, a discovery reference signal (e.g., sidelink discovery-reference signal (SD-RS)) included in a discovery message, and/or a synchronization signal. |
| Measurement filtering information | | 'Measurement filtering information' may be information on filter coefficients for signal measurement. |
| Measurement scheme Control information | | 'Measurement scheme control information' may be information on a measurement periodicity, a measurement period, and/or resources in which measurement is performed in a resource pool. |
| Sidelink discovery thresholds | Minimum RSRP threshold (or, minimum RSRQ threshold) | 'Minimum RSRP threshold' may be a reference value for operating as a relay terminal, and may be a minimum value of an RSRP measured by a cell (e.g., serving cell). |
| | Maximum RSRP threshold (or, maximum RSRQ threshold) | 'Maximum RSRP threshold' may be a reference value for operating as a relay terminal, and may be a maximum value of an RSRP measured by a cell (e.g., serving cell). |
| | RSRP range (or, RSRQ range) | 'RSRP range' may be a range of RSRP measured by a cell (e.g., serving cell). |
| | Sidelink minimum threshold | 'Sidelink minimum threshold' may be a measurement threshold of a measurement object (e.g., sidelink reference signal) configured for discovery of a relay terminal. |

Based on the sidelink discovery threshold defined in Table 4, when an RSRP of a neighboring terminal is equal to or greater than the minimum RSRP threshold, the neighboring terminal may be determined to be a relay terminal (e.g., candidate terminal, candidate relay terminal, or final relay terminal). When an RSRP of a neighboring terminal is less than or equal to the maximum RSRP threshold, the neighboring terminal may be determined to be a relay terminal (e.g., candidate terminal, candidate relay terminal, or final relay terminal). Alternatively, when the RSRP of the neighboring terminal falls within a RSRP range, the neighboring terminal may be selected as a relay terminal (e.g., candidate terminal, candidate relay terminal, or final relay terminal).

Meanwhile, radio resources for the beam sweeping operation in the step S504 shown in FIG. 5 may be configured as follows. The beam sweeping operation between the relay terminal and the remote terminal may be performed using radio resources shown in FIG. 6. The remote terminal may perform the beam sweeping operation with one or more relay terminals, and may select at least one candidate terminal (or one relay terminal) from among the one or more relay terminals.

Figure 6:
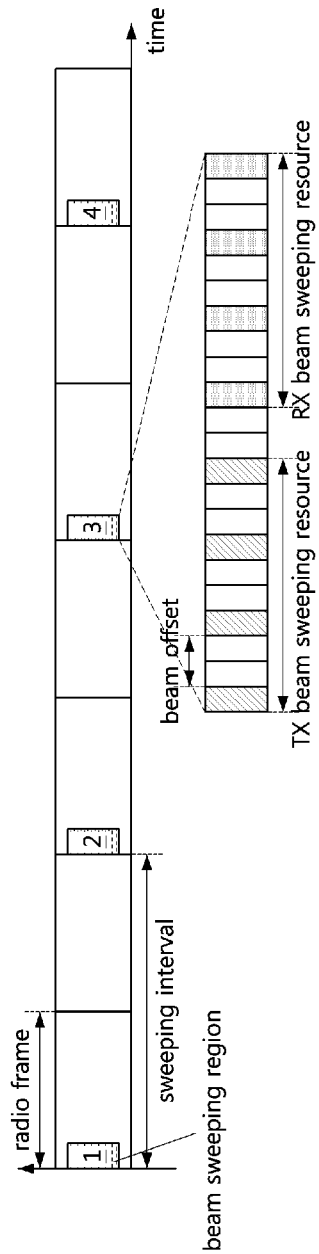
FIG. 6 is a conceptual diagram illustrating a first exemplary embodiment of radio resources for a beam sweeping operation.

FIG. 6 is a conceptual diagram illustrating a first exemplary embodiment of radio resources for a beam sweeping operation.

Referring to FIG. 6, the beam sweeping operation may be performed for ultra-high frequency band communication. A sweeping period(s) (e.g., sweeping region(s)) for beam sweeping may be periodically configured on a radio frame basis. In the sweeping region, a measurement signal may be transmitted using beams as many as the number of beams available in the terminal (e.g., relay terminal and/or remote terminal). The resource configuration information of beam sweeping may be classified into two types according to a method of configuring beam sweeping region(s) for transmission beam sweeping and reception beam sweeping as follows. In exemplary embodiments, the 'beam sweeping region' may be referred to as a 'sweeping region'.

Resource allocation using one beam sweeping region: In one beam sweeping region, a transmission beam sweeping resource and a reception beam sweeping resource may be configured. For example, a signal may be transmitted using a transmission beam in a beam sweeping region #3, and a measurement result of the corresponding signal may be transmitted in the beam sweeping region #3. In this scheme, the location of the transmission beam sweeping resource and the location of the reception beam sweeping resource may be configured in advance.

Resource allocation using a plurality of beam sweeping regions: A transmission beam sweeping resource and a reception beam sweeping resource may be configured in one or more beam sweeping regions. For example, a signal may be transmitted using a transmission beam in a beam sweeping region #1, and a measurement result of the signal of the beam sweeping region #1 may be transmitted in a beam sweeping region #2. In this scheme, the location of the transmission beam sweeping region and the location of the reception beam sweeping region may be configured in advance.

In the beam sweeping region, a signal transmitted for each beam may be scrambled using a beam identifier (e.g., beam index), and the scrambled signal may be transmitted. In this case, the terminal (e.g., relay terminal and/or remote terminal) may identify the beam identifier based on the received signal. The terminal (e.g., relay terminal and/or remote terminal) may perform a measurement operation on the signal(s) transmitted through the transmission beam(s), select one or more transmission beam(s) based on a result of the measurement operation, and transmit information of the selected transmission beam(s). The information of the selected transmission beam(s) may be transmitted through a MAC signaling message (e.g., MAC control element (CE)) and/or a PHY signaling message (e.g., control information, sidelink control information (SCI)).

In the beam sweeping procedure, a terminal that transmits a signal using a transmission beam may be a relay terminal, and in this case, a terminal that transmits a measurement result for the signal (or information of transmission beam(s) selected based on the measurement result) may be a remote terminal. Alternatively, a terminal that transmits a signal using a transmission beam in the beam sweeping procedure may be a remote terminal, and in this case, a terminal that transmits a measurement result for the signal (or information of transmission beam(s) selected based on the measurement result) may be a relay terminal.

Meanwhile, configuration information of a resource pool (e.g., radio resource pool) for transmission and reception of a discovery message (e.g., discovery signal) may include time resource information and/or frequency resource information for terminal discovery, information on an interval between discovery periods, and/or information of subframes and/or slots that can be searched within each discovery period. Radio resources for transmission and reception of a discovery message may be variably configured in frequency resources and/or time resources in a form of a bandwidth part (BWP).

Figure 7:
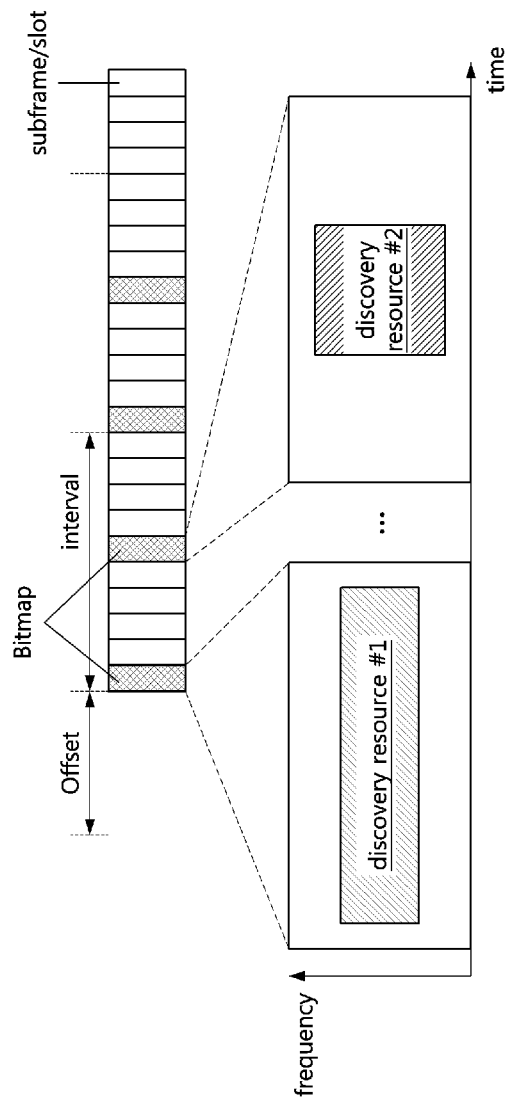
FIG. 7 is a conceptual diagram illustrating a first exemplary embodiment of a resource pool for transmission and reception of discovery messages.

FIG. 7 is a conceptual diagram illustrating a first exemplary embodiment of a resource pool for transmission and reception of discovery messages.

As shown in FIG. 7, an offset may be a duration (e.g., time) from a system frame number (SFN) 0 to a start point of radio resources for transmission and reception of discovery messages. An interval may indicate a length of a resource pool that is periodically configured. The radio resources for transmission and reception of discovery messages in the resource pool included in each interval may be configured based on a bitmap. Each of the offset and interval may be configured in units of symbols, mini-slots, slots, or subframes.

For example, the interval may be 10, and the bitmap may be set to '10001000' in a period according to the interval. A bit set to a first value (e.g., '1') in the bitmap may indicate that a resource (e.g., slot or subframe) mapped to the corresponding bit is used for transmission and reception of a discovery message. A bit set to a second value (e.g., '0') in the bitmap may indicate that a radio resource (e.g., slot or subframe) mapped to the corresponding bit is not used for transmission and reception of a discovery message. The radio resources for transmission and reception of discovery messages may be variably configured for the respective subframes or slots.

The base station may configure terminal(s) as one or more groups (e.g., terminal groups), and independently configure a resource pool for transmission and reception of discovery messages for each terminal group. For example, a resource pool of a terminal group #1 may be configured differently from a resource pool of a terminal group #2. Alternatively, the resource pool of the terminal group #1 may be configured to be the same as the resource pool of the terminal group #2. The above-described resource pool may be configured by a dedicated signaling procedure between the base station and the remote terminal and/or a dedicated signaling procedure between the base station and the relay terminal.

The dedicated signaling procedure may be a transmission and reception procedure of an individual signal. The terminal group-based resource pool may be configured in consideration of characteristics of transmitted/received traffic.

When the resource pool for transmission and reception of discovery messages is configured by the dedicated signaling procedure between the base station and the terminal (e.g., relay terminal and/or remote terminal), the existing broadcast information (e.g., system information, RRC information) may be overridden by information indicated by the dedicated signaling procedure. A priority of the resource pool configured by the dedicated signaling procedure may be higher than the priority of the resource pool configured by the broadcast information. The configuration periodicity of the resource pool may be set in consideration of the transmission periodicity of the system information and/or a paging message of the remote terminal.

FIG. 8 is a conceptual diagram illustrating a second exemplary embodiment of a resource pool for transmission and reception of discovery messages.

As shown in FIG. 8, a resource pool for transmission and reception of discovery messages for a terminal group #1 may be configured every 20 subframes. A resource pool for transmission of discovery messages for a terminal group #2 and a resource pool for reception of discovery messages for a terminal group #2 may be configured in different subframes.

Referring back to FIGS. 5A and 5B, if the remote terminal exists within the service coverage of the cell, in the step S502, the remote terminal may obtain configuration information for the relay discovery/selection operation through the system information received from the base station. If the remote terminal does not exist within the service coverage of the cell, the remote terminal may configure radio resources, frequency, PLMN, and/or measurement configuration information based on preconfigured information.

In the step S503, the relay terminal may configure a radio link by performing an RRC connection reconfiguration procedure with the base station, and may operate in an RRC connected state. For example, the operating state of the relay terminal may transition to the RRC connected state.

The relay terminal may perform a sidelink discovery operation and/or sidelink communication between terminals. In this case, in the step S503, the relay terminal may transmit sidelink UE information (e.g., sidelink UE information message) to the base station. After the sidelink UE information is transmitted to the base station, the relay terminal may perform an RRC connection reconfiguration procedure with the base station. The sidelink UE information may include information indicating whether the relay terminal performs (e.g., supports) the sidelink discovery operation (e.g., relay discovery/selection operation) and/or information indicating whether the relay terminal performs (e.g., supports) sidelink communication (e.g., relay communication).

The base station may receive the sidelink UE information from the relay terminal, and may perform an RRC connection reconfiguration procedure based on the information (e.g., information element(s)) included in the sidelink UE information. In the above-described procedures, the base station may allocate and/or release radio resources for the sidelink discovery operation and/or sidelink communication, and may determine whether to configure a gap for measurement of another frequency.

The system information transmitted in the step S502 may include the sidelink discovery threshold. If a measured RSRP is between the minimum RSRP (e.g., the minimum RSRP threshold) and the maximum RSRP (e.g., the maximum RSRP threshold) indicated by the sidelink discovery thresholds, the corresponding terminal may operate as a relay terminal.

In the step S504, the remote terminal may perform a procedure for discovering a relay terminal when the following condition(s) are satisfied.
Condition 1: a quality of the access link (e.g., link between the remote terminal and the base station) is deteriorated, and search of an adjacent cell to which the remote terminal can be handed over fails.
Condition 2: a power consumption for communication in the access link exceeds a preconfigured threshold.

The condition for the remote terminal to discover a relay terminal may be based on configuration by the terminal (e.g., remote terminal) and/or configuration by the network. When the autonomous configuration of the terminal is used, the remote terminal may determine whether a discovery procedure is triggered based on information configured in a universal subscriber identity module (USIM) or the like. When the configuration by the network is used, the remote terminal may determine whether a discovery procedure is triggered based on system information and/or a terminal-specific signal received from the base station. That is, the condition for discovering a relay terminal may be configured by system information and/or a terminal-specific signal.

The relay terminal (e.g., a higher layer of the relay terminal) may perform a procedure for discovering neighboring terminals (e.g., remote terminals). In the procedure for discovering neighboring terminals, the relay terminal may transmit a discovery message (e.g., an announcement message or a solicitation message). In the step S504, the discovery procedure may be performed based on a mode A or a mode B.

When the mode A is used, a relay terminal (e.g., one or more relay terminals) may transmit announcement message(s) in a broadcast manner, and a neighboring terminal (e.g., remote terminal) may perform a monitoring operation for receiving an announcement(s) message to discover a relay terminal. That is, the remote terminal may discovery relay terminal(s) based on the announcement message(s) received from the relay terminal (e.g., one or more relay terminals).

When the mode B is used, the discovery procedure may be performed through exchange of a solicitation message and a response message between the terminals participating in the discovery procedure. For example, the relay terminal (e.g., one or more relay terminals) may transmit a solicitation message to discover the neighboring terminal (e.g., remote terminal), and the neighboring terminal (e.g., remote terminal) may perform a monitoring operation for receiving the solicitation message to discover the relay terminal. That is, the remote terminal may receive the solicitation message to discover the neighboring terminal (e.g., relay terminal). When the solicitation message is received, the remote terminal may transmit a response message to the relay terminal in response to the solicitation message. The response message may be transmitted to all relay terminals that have transmitted the solicitation messages or one or more relay terminals from among all the relay terminals that have transmitted the solicitation messages.

The announcement message and/or solicitation message transmitted from the relay terminal may include information (e.g., service code) indicating that the corresponding relay terminal performs a relay function. The remote terminal may determine whether the neighboring terminal performs a relay function based on the information (e.g., service code)

included in the announcement message and/or the solicitation message received from the neighboring terminal (e.g., relay terminal).

The remote terminal (e.g., a higher layer of the remote terminal) may obtain an identifier of the relay terminal by performing the discovery procedure. In addition, the higher layer of the remote terminal (e.g., an entity performing functions of the higher layer) may exchange the following information with a packet data convergence protocol (PDCP) layer and/or a service data adaptation protocol (SDAP) layer to perform the discovery procedure. The higher layer of the remote terminal may be a radio link control (RLC) layer.

Relayable service(s) (e.g., UE-to-network relay) of the relay terminal

A group (e.g., terminal group) that includes the relay terminal

A Data Network Name (DNN) and/or a Network Slice Selection Assistance Information (NSSAI) serviceable by the relay terminal PLMN information for the relay terminal Information on a relay terminal, which is preconfigured in the remote terminal For the transfer of the message (e.g., discovery message) in the discovery procedure, the following protocol structure(s) may be considered.

Figure 9A:
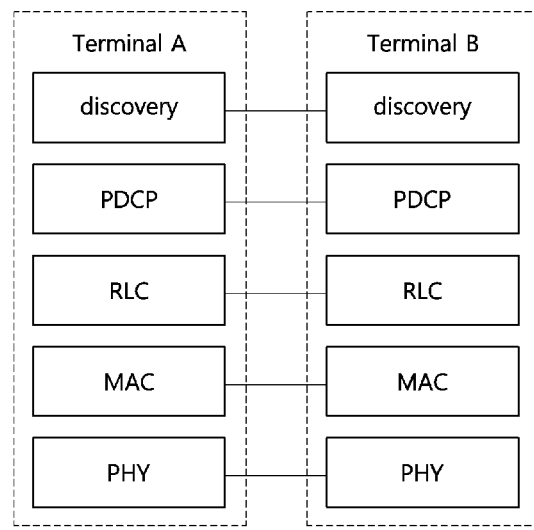
FIG. 9A is a block diagram illustrating a first exemplary embodiment of a protocol structure of a control plane for transmission and reception of a discovery message.
Figure 9B:
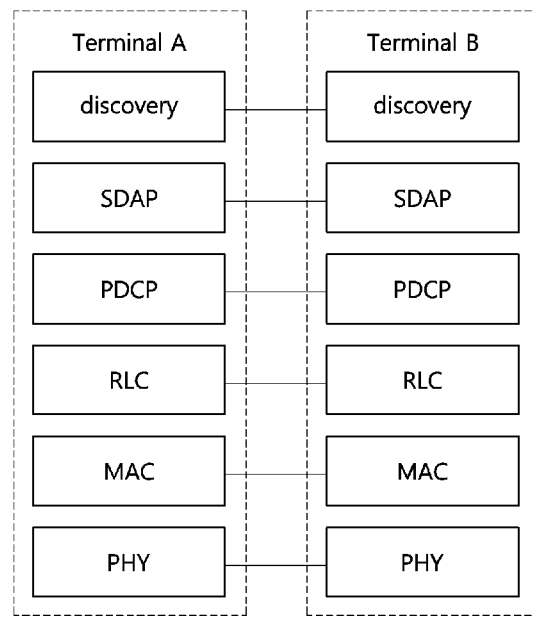
FIG. 9B is a block diagram illustrating a first exemplary embodiment of a protocol structure of a user plane for transmission and reception of a discovery message.

FIG. 9A is a block diagram illustrating a first exemplary embodiment of a protocol structure of a control plane for transmission and reception of a discovery message, and FIG. 9B is a block diagram illustrating a first exemplary embodiment of a protocol structure of a user plane for transmission and reception of a discovery message.

As shown in FIG. 9A, a discovery message may be transmitted and received using protocols of a control plane. The discovery message may be delivered through the PC5-S/PDCP/RLC/MAC/PHY protocols. The discovery message (e.g., discovery related message) may be delivered through a sidelink (SL) signaling radio bearer (SRB). In this case, the SL SRB for transmission of the discovery message of the relay terminal may be configured with the same value (e.g., SL_SRB=0) as an SL_SRB used in the PC5 or a different value (e.g., SL_SRB=1) therefrom. When the SL_SRB is configured with a different value, the discovery message associated with the corresponding SL_SRB may have a priority, and additional processing for this operation may be performed.

As shown in FIG. 9B, the discovery message may be transmitted and received using protocols of a user plane. The discovery message may be delivered through the data flow/SDAP/PDCP/RLC/MAC/PHY protocols. The discovery message (e.g., discovery related message) may be delivered through a dedicated radio bearer (SL DRB).

When the discovery message is transmitted using the protocols of the control plane, the following method(s) may be considered to identify the transmission of the discovery message and/or to distinguish the discovery message from other sidelink messages in the radio access layer.

Method 1: In the PDCP layer, a new service data unit (SDU) type indicating a discovery message may be defined, and a PDCP protocol data unit (PDU) in which the new type of SDU is configured may be generated and transmitted in the discovery message transmission/reception procedure.

Method 2: In the MAC layer, a dedicated logical channel identifier (LCD) for transmission of a discovery message may be defined, and the discovery message may be transmitted and received using the corresponding LCID. The LCID configured for transmission of a discovery message may be referred to as a discovery (D)-LCID. The MAC layer of the transmitting node (e.g., relay terminal) may transmit a discovery message for the relay discovery/selection operation through a logical channel having the D-LCID. The MAC layer of the receiving node (e.g., remote terminal) may identify the discovery message through the logical channel having the D-LCID. For example, a specific logical channel number may be assigned for a discovery message for the relay discovery/selection operation, and a higher priority may be assigned to the corresponding logical channel. Since the length of the discovery message for the relay discovery/selection operation is set based on a Prioritized Bit Rate (PBR), the transmission priority of the discovery message may be guaranteed.

Method 3: In the MAC layer, a layer 2 destination address for transmission of a discovery message may be defined, and the discovery message may be transmitted/received using the layer 2 destination address.

Method 4: In the MAC layer, a dedicated MAC CE for transmission of a discovery message of a relay terminal may be defined. In this case, a discovery message delivered to the MAC layer through a specific logical channel of the higher layer may be converted to a specific MAC CE, and transmission of the discovery message may be distinguished by adjusting a transmission/reception priority between MAC CEs. In this case, the remote terminal requesting discovery may newly define a logical channel identifier for transmission of the discovery message, and a MAC CE encapsulating the discovery message may be transmitted.

Method 5: In the PHY layer, a dedicated destination identifier for transmission of a discovery message may be used. Alternatively, an SCI including a flag or indicator indicating a discovery message may be defined, and the information (e.g., flag or indicator) included in the SCI may be utilized in the transmission/reception procedure of the discovery message. The discovery message (e.g., discovery message in form of a transport block) may be indicated using PHY control information of the transmitting node (e.g., relay terminal), and the PHY layer of the receiving node may identify the discovery message (e.g., discovery message in form of a transport block) based on the information included in the received SCI.

Method 6: A specific resource pool for transmission of a discovery message may be predefined, and a discovery message may be transmitted/received using the specific resource pool. Radio resources for transmission and reception of a discovery message for the relay discovery/selection operation and radio resources for transmission and reception of a discovery message for provision of various services may be allocated by two types of resource pool allocation schemes (e.g., separate resource pools) as follows. Information for the above-described operations may be obtained by system information and/or RRC information. Alternatively, the information for the above-described operations may be preconfigured.

Shared radio resource pool-based discovery message transmission/reception method: a discovery message for discovery and/or (re)selection of a relay terminal and a discovery message for providing various services (e.g., discovery service) may be transmitted and received using the same radio resource pool.

Dedicated radio resource pool-based discovery message transmission/reception method: A radio resource pool (e.g., transmission radio resource pool #1) in which a discovery message for the relay discovery/selection operation is transmitted and received may be configured differently from a radio resource pool (e.g., transmission radio resource pool #2) in which a discovery message for providing various services (e.g., discovery service) is transmitted and received. In this case, a transmission power control and transmission resource (e.g., resource periodicity, size of frequency resource, and/or size of time resource) for each of the dedicated radio resource pools may be configured.

Figure 10:
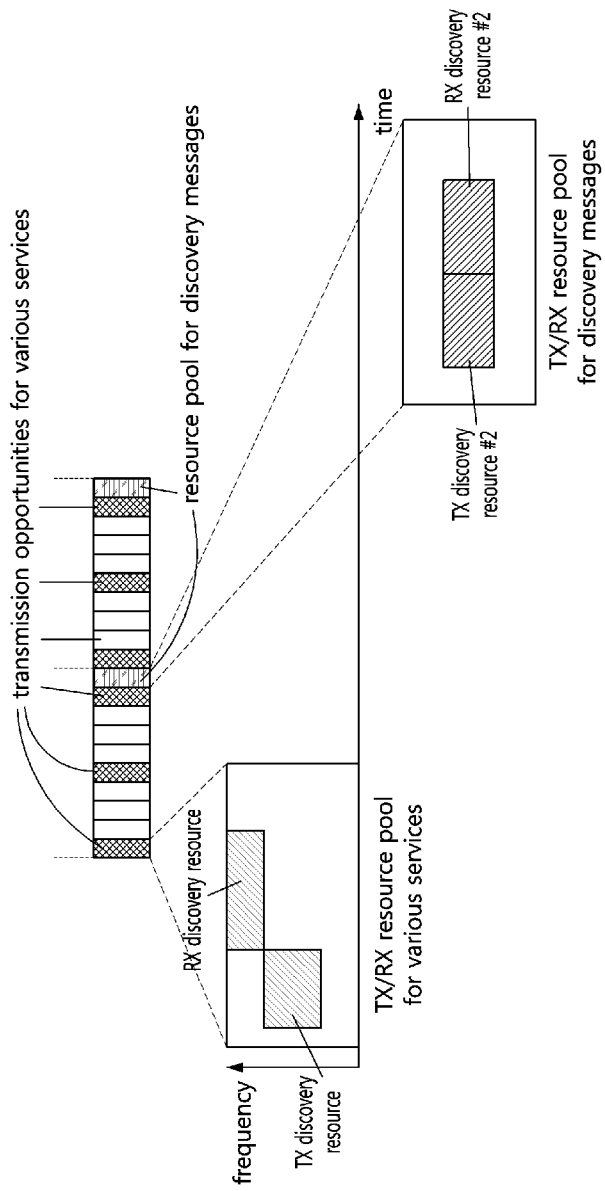
FIG. 10 is a conceptual diagram illustrating a first exemplary embodiment of a dedicated radio resource pool for transmission and reception of a discovery message.

FIG. 10 is a conceptual diagram illustrating a first exemplary embodiment of a dedicated radio resource pool for transmission and reception of a discovery message.

As shown in FIG. 10, a resource pool for transmission and reception of a discovery message for the relay discovery/selection operation may be configured, and a resource pool for transmission and reception of a discovery message for providing various services (e.g., discovery service) may be configured. The resource pool for transmission and reception of a discovery message for the relay discovery/selection operation may be configured differently from the resource pool for transmission and reception of a discovery message for providing various services. Resources (e.g., radio resources) for transmission and reception of a discovery message for the relay discovery/selection operation may be allocated (or selected) based on the following scheme(s).

Resource allocation scheme based on scheduling of the base station: The resource allocation procedure for a discovery message may be performed on a terminal basis. To support this operation, the terminal operating in the RRC connected state may request resource allocation from the base station, and the base station may allocate a resource according to the request for resource allocation from the terminal. The above-described operations may be performed in an RRC connection reconfiguration procedure. In this case, the resource allocated to the terminal may be a resource included in the resource pool.

Resource selection scheme based on autonomous selection of the terminal: The resource allocation for a discovery message may not be performed on a terminal basis. That is, a resource for a discovery message may be configured (e.g., selected) based on resource pool configuration information included in a broadcast signaling message (e.g., system information) and/or a dedicated signaling message received from the base station. The terminal (e.g., relay terminal or remote terminal) may autonomously select a resource for transmission of a discovery message within the resource pool configured by the base station, and may transmit the discovery message in a transmission period (e.g., autonomously-selected resource) of the discovery message.

The autonomous resource selection scheme of the terminal may be performed based on the following method(s).

Method 1 (random resource selection method): The terminal may select an arbitrary resource among radio resources configured for transmission of a discovery message, and may transmit and receive a discovery message using the selected random resource.

Method 2 (sensing-based resource selection method): The terminal (e.g., terminal to transmit a discovery message) may perform a sensing operation on a specific region of radio resources configured for transmission of a discovery message, and if the sensing operation is successful, the terminal may transmit a discovery message in the specific region. The sensing operation may be a listen before talk (LBT) operation. That the sensing operation is successful may mean that the radio resource is in an idle state. The terminal (e.g., terminal to receive a discovery message) may receive the discovery message by performing a decoding operation on the radio resource in which the sensing operation is successful.

Method 3 (transmission probability-based resource selection method): A radio resource for a discovery message may be selected based on a transmission probability threshold. When a transmission probability selected by the terminal is less than or equal to the transmission probability threshold, the terminal may select a radio resource for transmission of a discovery message, and may transmit a discovery message using the selected radio resource. For example, the terminal to transmit a discovery message may select an arbitrary value between 0 and 1. For example, when the transmission probability threshold is 0.7 and the value selected by the terminal is 0.7 or less, the terminal may transmit a discovery message using the selected radio resource (e.g., discovery resource).

Referring back to FIGS. 5A and 5B, the discovery procedure may be performed according to the RRC state of the terminal (e.g., RRC connected state, RRC idle state, or RRC inactive state).

The terminal operating in the RRC idle state or the RRC inactive state may autonomously select a resource within a resource pool indicated by the system information (e.g., master information block (MIB), system information block (SIB)) received from the base station in the step S502, and transmit a discovery message using the selected resource. If the system information received in the step S502 does not include configuration information of a resource pool for terminal discovery, the terminal may transition the operating state to the RRC connected state. The terminal operating in the RRC connected state may receive a dedicated signaling message from the base station, and transmit a discovery message using a resource indicated by the dedicated signaling message.

The terminal operating in the RRC connected state may request the base station to allocate a resource (e.g., time and/or frequency resource) for transmission of a discovery message. The base station may receive the request for resource allocation from the terminal. In this case, the base station may perform authentication for the corresponding terminal based on UE context information received from a control functional node (e.g., MME or AMF) of the core network, and may configure a resource that the terminal can select through an RRC signaling procedure. The radio resource configured by the base station through the RRC signaling procedure may be reconfigured (e.g., overridden) through another RRC signaling procedure. The radio resource configured by the base station through the RRC signaling procedure may be valid until the operating state of the terminal transitions to the RRC idle state or the RRC inactive state.

When the terminal exists within the service coverage of the cell, the terminal may use resource allocation information (e.g., sidelink resource allocation information) scheduled by the base station. Even when the terminal exists within the service coverage of the cell, if the following event(s) occurs, the terminal may use an autonomously-selected resource instead of the resource allocated by the base station.

T311: An event that a timer for a RRC connection reestablishment procedure has started or expired.

T301: An event that a timer for transmission of a RRC connection reestablishment request has started or expired.

T310: An event that a timer related to a physical layer problem has started or expired. The T310 may be started when a physical layer problem occurs.

The terminal (e.g., remote terminal and/or relay terminal) may exchange messages (e.g., higher layer messages) according to the mode A or the mode B in the step S504. In the step S504, the terminal may perform a sidelink measurement procedure using the parameter(s) configured in the step S502. The sidelink measurement procedure may be performed based on a reference signal. The reference signal may be a DMRS included in the discovery message and/or a discovery reference signal (e.g., SD-RS) configured for terminal discovery. In the sidelink measurement procedure, the terminal may measure an RSRP and/or reference signal received quality (RSRQ) for the reference signal.

The discovery procedure of the terminal may be performed using a frequency of a high frequency band (or, ultra-high frequency band). In this case, the terminal may perform a beam selection procedure for transmitting and receiving a discovery message (or data) by using the beam sweeping information configured in the step S502. This operation may be the beam sweeping operation in the step S504. The beam sweeping operation may be classified into a transmission beam sweeping operation and a reception beam sweeping operation. When the transmission beam sweeping operation is performed, a transmitting terminal may transmit signals (e.g., measurement signals) by using transmission beams having different directions. A receiving terminal may perform a measurement operation on signals received through the transmission beams, and may select an optimal transmission beam based on a result of the measurement operation. The optimal transmission beam may be a transmission beam in which a signal having the best RSRP or RSRQ is transmitted. Here, the receiving terminal may transmit information of the optimal transmission beam (e.g., beam index) to the transmitting terminal.

After selecting the optimal transmission beam, the receiving terminal may perform the reception beam sweeping operation. In the reception beam sweeping operation, the receiving terminal may select a reception beam (e.g., reception direction) capable of optimally receiving a signal transmitted through the optimal transmission beam. In exemplary embodiments, the reception beam may mean a reception direction at the receiving terminal. The receiving terminal may transmit information (e.g., beam index) of the selected optimal reception beam to the transmitting terminal. In addition, the receiving terminal may transmit information on a pair of the optimal transmission beam and the optimal reception beam to the transmitting terminal.

In a configured beam sweeping region, the terminal (e.g., remote terminal, relay terminal) may select an arbitrary resource, and transmit a signal (e.g., measurement signal) using the selected random resource. The beam sweeping operation (e.g., beam sweeping procedure) may be performed based on the measurement signal.

The above-described optimal beam (e.g., optimal transmission beam) may be a beam having the best quality among beams having a radio channel quality equal to or greater than a threshold. Configuration information for the transmission beam sweeping operation and/or the reception beam sweeping operation may be included in the system information broadcasted by the base station. Each of the remote terminal and the relay terminal may identify the configuration information for the transmission beam sweeping operation and/or reception beam sweeping operation by receiving the system information from the base station.

Figure 11:
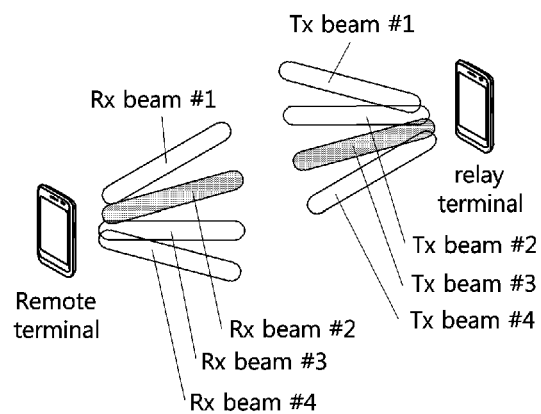
FIG. 11 is a conceptual diagram illustrating a first exemplary embodiment of a beam sweeping method.

FIG. 11 is a conceptual diagram illustrating a first exemplary embodiment of a beam sweeping method.

As shown in FIG. 11, a relay terminal may transmit measurement signals using four transmission (Tx) beams based on the information configured in the step S502 shown in FIG. 5A. The four transmission beams may be independent beams. A remote terminal may perform a measurement operation on the measurement signals transmitted through four transmission beams, and may determine a transmission beam #3 as an optimal transmission beam based on a result of the measurement operation. The remote terminal may determine a reception beam #2 (e.g., reception direction) capable of optimally receiving the signal transmitted through the transmission beam #3 by performing the reception beam sweeping operation. The remote terminal may transmit information on a pair of (transmission beam #3-reception beam #2) to the relay terminal. The remote terminal and the relay terminal may perform sidelink communication by using the pair of (transmission beam #3-reception beam #2).

Figure 12:
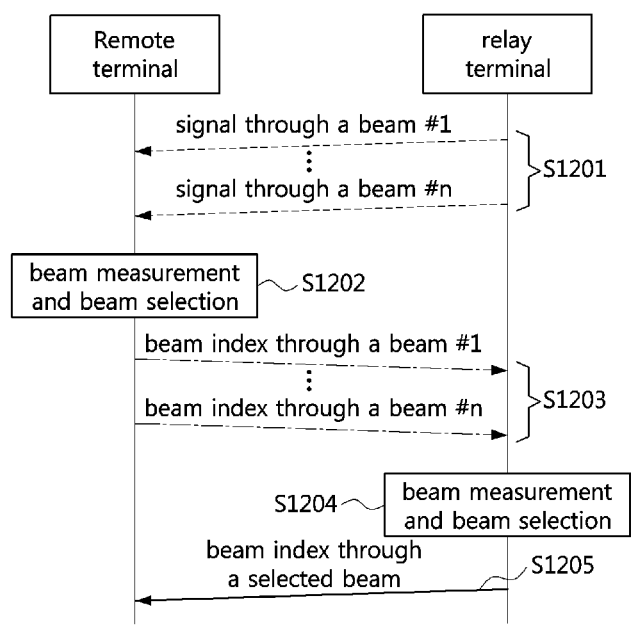
FIG. 12 is a sequence chart illustrating a first exemplary embodiment of a beam discovery method (e.g., beam sweeping method) in a beam sweeping region.

FIG. 12 is a sequence chart illustrating a first exemplary embodiment of a beam discovery method (e.g., beam sweeping method) in a beam sweeping region.

As shown in FIG. 12, a relay terminal may transmit a signal (e.g., measurement signal) including a beam identifier (e.g., beam index) using each of transmission beams (S1201). In the step S1201, the signal may be transmitted using a radio resource of the transmission beam (e.g., radio resource allocated for each beam identifier). In the step S1202, a remote terminal may perform a measurement operation on the signals transmitted through the transmission beams of the relay terminal, and may determine an optimal transmission beam based on a result of the measurement operation.

The remote terminal may transmit a signal (e.g., measurement signal) including a beam identifier (e.g., beam index) using each of reception beams (S1203). In the step S1203, the signal may be transmitted using a radio resource of the reception beam, a preconfigured radio resource (e.g., radio resource allocated for each beam identifier), or a radio resource associated with the optimal transmission beam selected in the step S1202. The signal transmitted in the step S1203 may include information (e.g., beam index) of the optimal transmission beam selected in the step S1202.

The signal including the information of the optimal transmission beam may be PHY control information (e.g., SCI) and/or a MAC CE. The relay terminal may identify the optimal transmission beam by receiving the signal from the remote terminal. The relay terminal may perform a measurement operation on the signals transmitted through the reception beams of the remote terminal, and may determine an optimal reception beam based on a result of the measurement operation (S1204). The relay terminal may transmit data (e.g., the index of the optimal reception beam determined in the step S1204) to the remote terminal by using the optimal transmission beam (S1205). The signal including the information of the optimal reception beam may be PHY control information (e.g., SCI) and/or a MAC CE. Alternatively, when the mode A or mode B shown in FIG. 5A is used, the information of the optimal reception beam may be included in PHY control information (e.g., SCI) and/or a MAC CE. The remote terminal may receive the signal (e.g., data) through the optimal transmission beam of the relay terminal, and may identify the optimal reception beam based on the information included in the received signal.

Referring back to FIGS. 5A and 5B, a step S505 may be performed after the step S504 is completed. In the step S505, the remote terminal may select a relay terminal based on the measurement result of the step S504. The procedure for selecting a relay terminal may be performed by an RRC protocol (e.g., RRC layer). The procedure for selecting a relay terminal may be classified into a selection scheme 1 and a selection scheme 2 according to a subject that selects a relay terminal.

Selection scheme 1: When the selection scheme 1 is used, the base station may select a relay terminal. When the step S504 is performed according to the mode A, the remote terminal may generate a relay terminal list including information of one or more discovered relay terminals (e.g., candidate terminals), and transmit a terminal discovery report message including the relay terminal list to the base station. The base station may receive the terminal discovery report message from the remote terminal, and may select a relay terminal based on the relay terminal list included in the terminal discovery report message. Here, the terminal discovery report message may be received by the relay terminal, and the relay terminal may transmit the corresponding terminal discovery report message to the base station.

When the step S504 is performed according to the mode B, not only the remote terminal but also the relay terminal may transmit the terminal discovery report message including the relay terminal list to the base station. In this case, the base station may receive the terminal discovery report message from the remote terminal and/or the relay terminal, and may select a relay terminal based on the relay terminal list included in the terminal discovery report message.

The base station may select a relay terminal in consideration of load level(s) of relay terminal(s), a signal strength (or signal quality) of each radio link, and/or the like. The base station may transmit information on the selected relay terminal to the remote terminal and/or the relay terminal. For example, the base station may transmit an identifier of the selected relay terminal in an RRC connection reconfiguration procedure. The selection scheme 1 may be performed when both the remote terminal and the relay terminal exist within the service coverage.

Selection scheme 2: When the selection scheme 2 is used, the remote terminal may autonomously select a relay terminal. The remote terminal may select a relay terminal from the relay terminal list, based on a received signal strength (or received signal quality) of a radio link between the remote terminal and a discovered relay terminal and/or a function of the discovered relay terminal (e.g., function indicated by a service code). In this case, the remote terminal may select a relay terminal based on parameter(s) configured by the system information and/or the dedicated signaling message (e.g., RRC signaling message) of the base station. For example, the remote terminal may select a neighboring terminal that has transmitted a reference signal having an RSRP equal to or greater than the sidelink discovery threshold (e.g., minimum RSRP threshold) set in the step S502 as the relay terminal.

After the step S505 is completed, a sidelink setup procedure may be performed (S506). In the step S506, an operation for configuring a direct link between the remote terminal and the relay terminal, an operation related to security of the direct link, and/or an operation for allocating an Internet protocol (IP) address may be performed. The remote terminal may perform an IP address allocation procedure used for sidelink communication. In this case, the relay terminal may perform a function of a dynamic host configuration protocol (DHCP) server.

After the sidelink between the remote terminal and the relay terminal is configured, in the step S507, the relay terminal may transmit, to the core network (e.g., AMF or MME), UE context information including an identifier of a relay bearer of the remote terminal, a quality of service (QoS) flow identifier, and/or an identifier of the remote terminal, and the core network may transmit a response to the UE context information to the relay terminal. The UE context information may be delivered to an UPF or a gateway (e.g., S-GW or P-GW). The UE context information may be used for traffic mapping and processing for the relay bearer and the QoS flow.

After the step S507 is completed, sidelink communication between the remote terminal and the relay terminal may be performed (S508). For example, the relay terminal may transmit data (e.g., user data) received from the remote terminal to the base station, and the base station may transmit the data of the remote terminal received from the relay terminal to the core network. In addition, the base station may receive data (e.g., user data) for the remote terminal from the core network, and transmit the data to the relay terminal. The relay terminal may transmit the data for the remote terminal received from the base station to the remote terminal.

Meanwhile, the terminal (e.g., remote terminal or relay terminal) may periodically or aperiodically perform a measurement operation based on the information configured in the step S502 while performing sidelink communication (S509). When a received signal strength (or received signal quality) of a measured sidelink signal is less than a preconfigured threshold, the remote terminal may perform a relay discovery/selection operation for a new relay terminal. The relay discovery/selection operation for a new relay terminal may be performed based on the step S504.

The above-described method for selecting a relay terminal (e.g., the step S505 shown in FIG. 5B) may be performed as follows.

Figure 13:
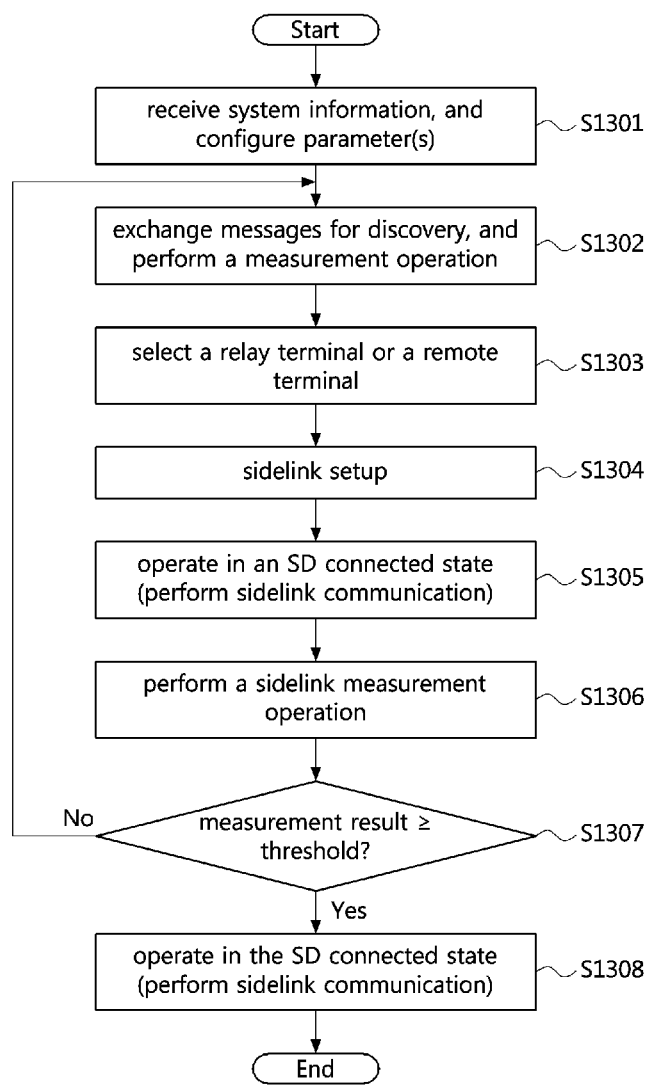
FIG. 13 is a flowchart illustrating a first exemplary embodiment of a method for selecting a relay terminal.

FIG. 13 is a flowchart illustrating a first exemplary embodiment of a method for selecting a relay terminal.

As shown in FIG. 13, a terminal (e.g., remote terminal and/or relay terminal) may receive system information (e.g., SIB) from a base station, and configure parameter(s) for a relay discovery/selection operation based on information (e.g., information element(s)) included in the system information (S1301). The parameter(s) for the relay discovery/selection operation may be parameter(s) described in Tables 1 to 4. In exemplary embodiments, the terminal may refer to a remote terminal and/or a relay terminal.

The terminal may perform a terminal discovery procedure using the parameter(s) configured in the step S1301. For example, terminals may exchange message(s) for terminal discovery, and may perform a sidelink (e.g., radio link state) measurement operation (S1302). The terminal (e.g., a higher layer of the terminal) may select a relay terminal or a remote terminal based on a result of the measurement operation (S1303). For example, the terminal may compare a received signal strength (or received signal quality), which is the result of the measurement operation, with a threshold configured in the step S1301, and may select a specific terminal having a received signal strength (or received signal quality) greater than or equal to the threshold as a relay terminal or a remote terminal. This operation may be performed using a frequency in a high frequency band (e.g., ultra-high frequency band). A terminal supporting beam-based communication may perform a beam selection procedure, and a higher layer of the terminal (e.g., an entity supporting the higher layer function) may perform a terminal discovery procedure.

The terminal may perform a sidelink setup procedure with the selected terminal (e.g., remote terminal or relay terminal) (S1304). When the sidelink setup procedure is completed, the terminal may operate in a sidelink (SD) connected state (S1305). That is, the operating state of the terminal may transition to the SD connected state.

The terminal operating in the SD connected state may perform sidelink communication. In addition, the terminal operating in the SD connected state may perform a sidelink measurement operation (S1306). The sidelink measurement operation (e.g., the step S1306) may be performed periodically or aperiodically based on the parameter(s) configured in the step S1301 while the sidelink is configured. The terminal may compare a received signal strength (or received signal quality) that is a result of the measurement operation with the threshold configured in the step S1301 (S1307). When the measurement result (e.g., received signal strength or received signal quality) is less than the threshold, the terminal may perform the step S1302 to discover a new relay terminal or a new remote terminal. If the measurement result is greater than or equal to the threshold, the terminal may continue to operate in the SD connected state (S1308). That is, the terminal may perform sidelink communication.

In the following exemplary embodiments, methods for extending a communication coverage and/or methods for providing a direct communication service between terminals without connection to a network will be described. The exemplary embodiments may be applied to relay-based sidelink (e.g., PC5 interface) and/or access link (e.g., Uu interface).

Coverage extension using a relay terminal may be classified into 'UE-to-network coverage extension' and 'UE-to-UE coverage extension'. The 'UE-to-network coverage extension' may refer to coverage extension of an access link (e.g., Uu interface) between a base station and a terminal for communication between the terminal (e.g., UE) located inside or outside of the cell coverage and the entity (i.e., base station) located in the network. The cell coverage may mean a service coverage (e.g., communication coverage) provided by the base station.

The 'UE-to-UE coverage extension' may refer to coverage extension of a sidelink (e.g., PC5 interface) between terminals for communication between the terminals (e.g., entities) located inside or outside of the cell coverage.

For data transmission of a terminal, a path may be configured through a relay terminal, and data may be transmitted through the configured path. Alternatively, the data may be transmitted through a path configured by the base station. To support these operations, a protocol structure for relay communication will be described. In order to ensure service continuity for a terminal (e.g., mobile terminal), a sidelink and an access link may be appropriately utilized. In addition, in order to ensure service continuity for the terminal (e.g., mobile terminal), a path may be configured or switched.

[Path Switching Scenario]

Figure 14:
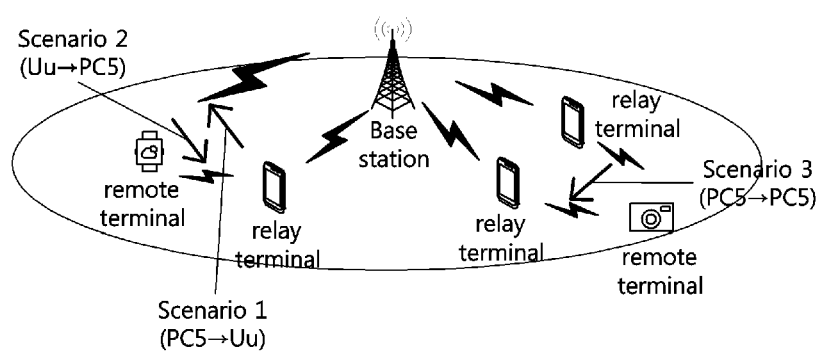
FIG. 14 is a conceptual diagram illustrating patch switching scenarios in a relay communication system.

FIG. 14 is a conceptual diagram illustrating patch switching scenarios in a relay communication system.

As shown in FIG. 14, path switching scenarios in a relay communication system may be defined as follows. In exemplary embodiments, the relay communication system may mean a 'communication system using terminal (UE) relaying', and a path may mean a 'communication path'.

Scenario 1: Path switching from a sidelink to an access link

Scenario 2: Path switching from an access link to a sidelink

Scenario 3: Path switching from a first sidelink to a second sidelink

In the relay communication system, each node (e.g., each functional node) may be defined as follows.

Remote terminal: A remote terminal may configure a sidelink with a relay terminal, and may transmit and receive data using the sidelink. That is, the terminal may transmit and receive data with a base station using a relay link consisting of the sidelink and an access link. Alternatively, the remote terminal may configure an access link with the base station, and may transmit and receive data using the access link without a relay terminal. The remote terminal may be referred to as a 'remote UE'.

Relay terminal: A relay terminal may configure a sidelink with a remote terminal, may configure an access link with a base station, and may relay data of the remote terminal using the sidelink and the access link. The relay terminal may be referred to as a 'relay UE'.

Base station: A base station may configure a cell in a specific area and may provide a service coverage. The base station may be a gNB or an eNB. The base station may be a distributed base station composed of a distributed unit (DU) and/or a central unit (CU).

Core network: In the 5G communication system, a core network may include an AMF in charge of control plane functions and a UPF in charge of user plane functions. In the 4G communication system, a core network may include an MME in charge of control plane functions and a gateway (e.g., S-GW, P-GW) in charge of user plane functions.

[Protocol Structure]

A protocol structure for the relay communication system may be defined as follows. An adaptation layer responsible for the relay function may be added on a radio link control (RLC) layer of the terminal (e.g., relay terminal and/or remote terminal). The adaptation layer may be a layer 2. The terminal including the adaptation layer may perform the relay function. In exemplary embodiments, the terminal may mean a relay terminal and/or a remote terminal. The protocols for the relay communication system may be classified into user plane protocols and control plane protocols.

Figure 15A:
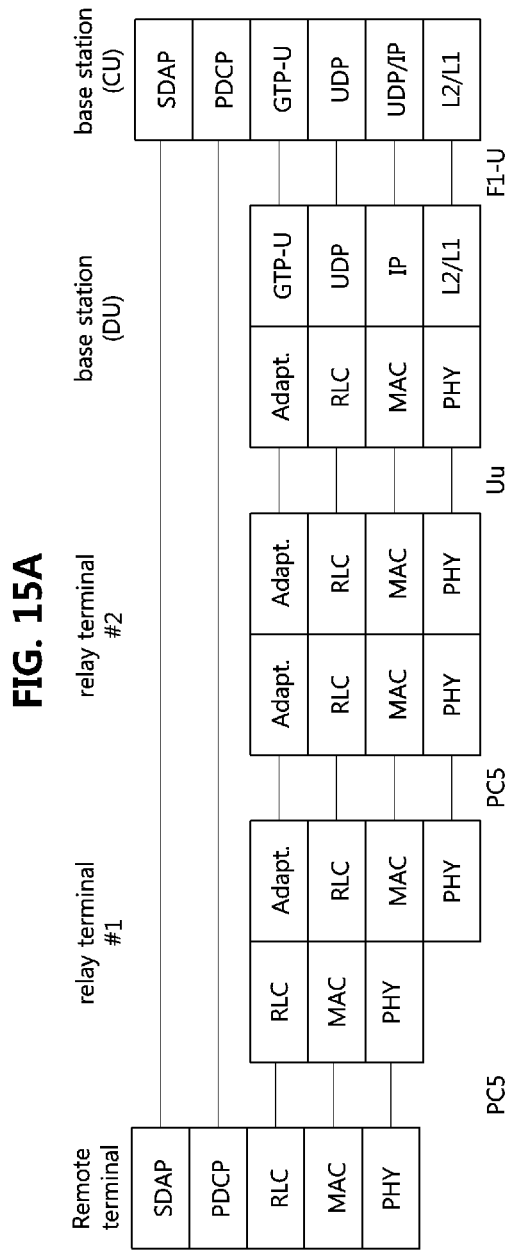
FIG. 15A is a block diagram illustrating a first exemplary embodiment of user plane protocols in a relay communication system.

FIG. 15A is a block diagram illustrating a first exemplary embodiment of user plane protocols in a relay communication system, and FIG. 15B is a block diagram illustrating a second exemplary embodiment of user plane protocols in a relay communication system.

As shown in FIGS. 15A and 15, each of the relay terminal(s) may further include an adaptation layer (i.e., Adapt.) supporting a relay function. The base station shown in FIG. 15A may be a distributed base station including a DU and/or a CU, and the base station shown in FIG. 15B may be a single base station without a DU-CU structure. The remote terminal may perform procedures according to the user plane protocols through the adaptation layer(s) of the relay terminal(s). For example, a Service Data Adaptation Protocol (SDAP) layer and a Packet Data Convergence Protocol (PDCP) layer of the remote terminal may operate in conjunction with SDAP/PDCP layers of the CU or the base station (e.g., eNB or gNB). The protocol layers of the sidelink (PC5) for communication with the remote terminal and the protocol layers of the access link (Uu) for communication with the base station may independently exist in the relay terminal.

Figure 16A:
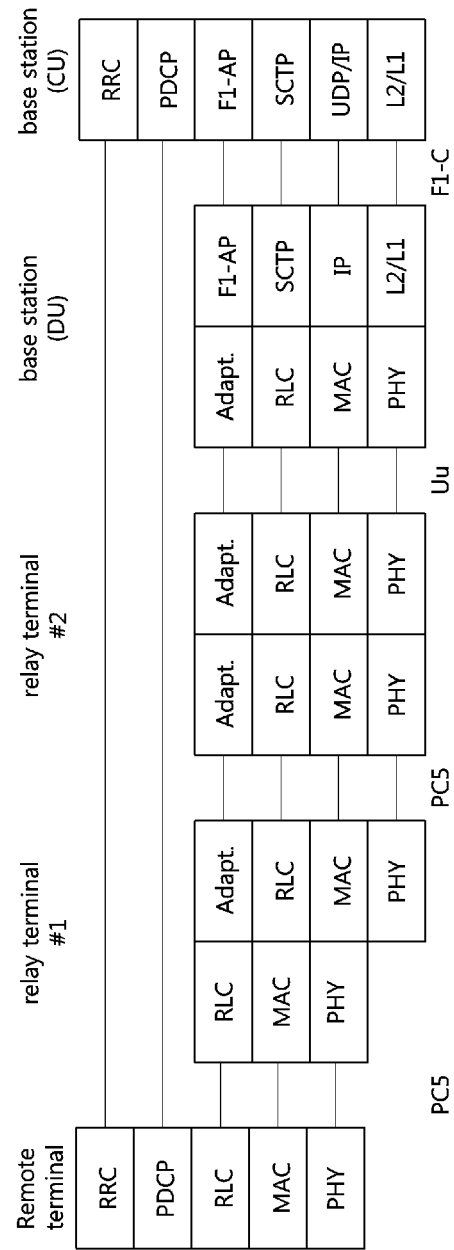
FIG. 16A is a block diagram illustrating a first exemplary embodiment of control plane protocols in a relay communication system.
Figure 16B:
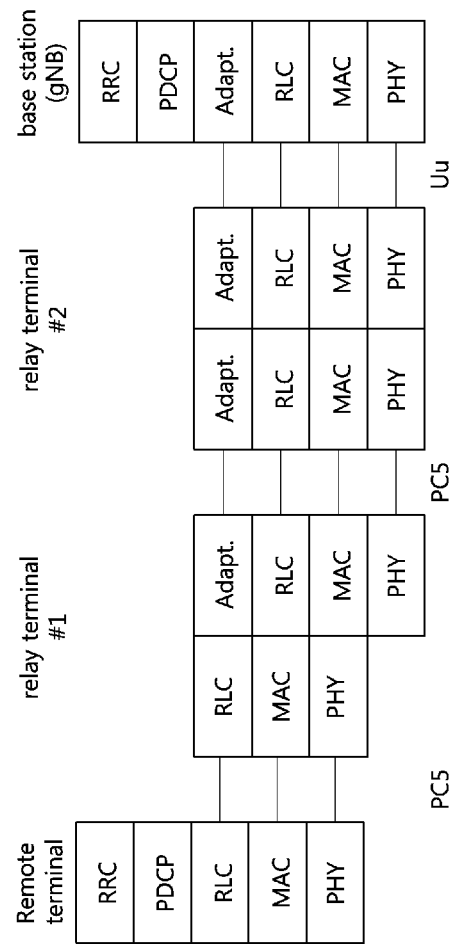
FIG. 16B is a block diagram illustrating a second exemplary embodiment of control plane protocols in a relay communication system.

FIG. 16A is a block diagram illustrating a first exemplary embodiment of control plane protocols in a relay communication system, and FIG. 16B is a block diagram illustrating a second exemplary embodiment of control plane protocols in a relay communication system.

As shown in FIGS. 16A and 16, each of the relay terminal(s) may further include an adaptation layer (i.e., Adapt.) supporting a relay function. The base station shown in FIG. 16A may be a distributed base station including a DU and/or a CU, and the base station shown in FIG. 16B may be a single base station without a DU-CU structure. The remote terminal may perform procedures according to the control plane protocols through the adaptation layer(s) of the relay terminal(s). For example, a Radio Resource Control (RRC) layer and a PDCP layer of the remote terminal may operate in conjunction with RRC/PDCP layers of the CU or the base station (e.g., eNB or gNB).

Functions of an application layer for the relay terminal may be defined as follows.

Identification of a radio bearer of the terminal

Data routing across a relay topology with multi-hop connection

Service Quality of Service (QoS) enforcement

Mapping of user plane data (e.g., protocol data unit (PDU)) between a sidelink (e.g., direct link) and an access link

[Path Switching Method of a Remote Terminal]

A remote terminal may switch a path using a relay terminal during communication. The path switching method of the remote terminal may be classified into a 'base station decision-based path switching method' and a 'terminal decision-based path switching method' according to a path selection subject (e.g., decision subject, switching subject).

Base Station Decision-Based Path Switching Method (e.g., Network Decision-Based Path Switching Method)

When the base station decision-based path switching method is used, a network or a base station may configure measurement and switching conditions for path switching to the remote terminal, and determine (e.g., perform) a path switching based on a report from the remote terminal. The path may mean a data transmission path through an access link (i.e., Uu) between the remote terminal and the base station or a data transmission path through a sidelink (i.e., PC5) between the remote terminal and the relay terminal. A data transmission path through the sidelink may include the sidelink and an access link. The sidelink and the access link may be referred to as a relay link. The reporting operation of the terminal may be performed based on the measurement and switching conditions configured by the network or the base station. The network or the base station may determine the path switching based on measurement information included in the report message of the terminal.

Terminal Decision-Based Path Switching Method (e.g., Remote Terminal Decision-Based Path Switching Method)

When the terminal decision-based path switching method is used, a network or a base station may configure measurement and switching conditions for path switching to the remote terminal, and the remote terminal may determine (e.g., perform) a path switching based on the configured information. The remote terminal may determine to switch a path, inform the network or the base station of the decision of switching the path, and perform the path switching. The path may mean a data transmission path through an access link (i.e., Uu) between the remote terminal and the base station or a data transmission path through a sidelink (i.e., PC5) between the remote terminal and the relay terminal. The data transmission path through the sidelink may include the sidelink and an access link. The sidelink and the access link may be referred to as a relay link.

[Path Switching Method from a Sidelink (PC5) to an Access Link (Uu)]

Figure 17:
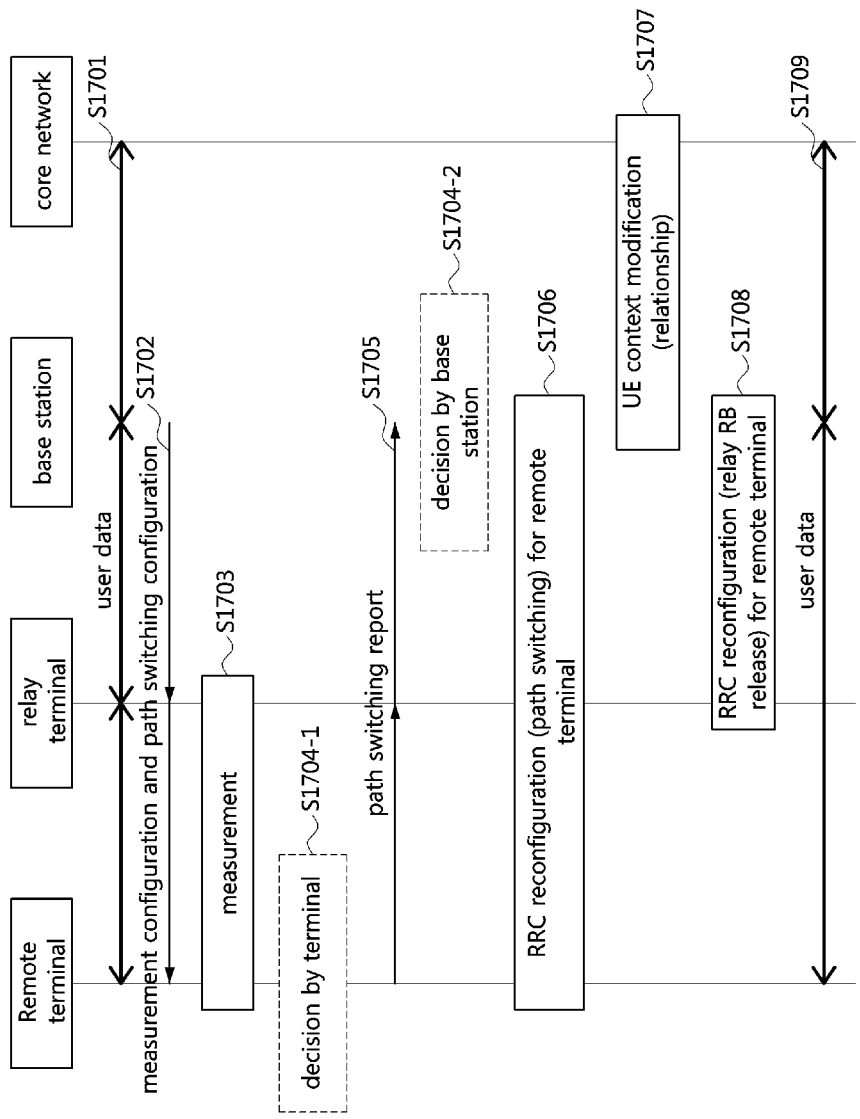
FIG. 17 is a sequence chart illustrating a first exemplary embodiment of a path switching method from a sidelink to an access link in a relay communication system.

FIG. 17 is a sequence chart illustrating a first exemplary embodiment of a path switching method from a sidelink to an access link in a relay communication system.

As shown in FIG. 17, data (e.g., user data) of a remote terminal may be transmitted/received through a sidelink and an access link (S1701). That is, a relay terminal may relay communication between the remote terminal and a base station. The base station may transmit measurement configuration information and/or path switching configuration information to the remote terminal (S1702). The measurement configuration information and/or path switching configuration information may be transmitted to the remote terminal through the relay terminal. The measurement configuration information and/or the path switching configuration information may instruct the remote terminal to perform a measurement operation on the sidelink and/or the access link.

The remote terminal may perform the measurement operation based on the measurement configuration information and/or path switching configuration information, and switch a current path (e.g., sidelink) to an access link based on a result of the measurement operation. For example, when a quality of the sidelink is less than or equal to a preconfigured threshold (or quality of the access link), the remote terminal may switch the sidelink to the access link. Each of the measurement configuration information and the path switching configuration information may be transmitted through a combination of one or more of a higher layer message (e.g., system information, RRC message), a medium access control (MAC) message (e.g., a MAC control element (CE)), and a PHY message (e.g., downlink control information (DCI)). Here, the system information may be a master information block (MIB) and/or a system information block (SIB), and the RRC message may be an RRC reconfiguration message.

When the measurement configuration information and/or the path switching configuration information is transmitted through the RRC message, the RRC message may be a dedicated signaling message. When the measurement configuration information and/or path switching configuration information is transmitted through the system information, the measurement configuration information and/or path switching configuration information may be transmitted in a broadcast manner. That is, the measurement configuration information and/or path switching configuration information may be included in a broadcast message. The measurement configuration information may include parameter(s) for measurement of the sidelink and/or the access link. The path switching configuration information may include parameter(s) for path switching (e.g., report of path switching) based on a measurement result. The parameter(s) may mean information element(s). The measurement configuration information and/or path switching configuration information may include one or more parameters defined in Tables 5 to 8 below.

TABLE 5

| Measurement target | |
|---|---|
| Sidelink (SL)-RSRP (or, SL-RSRQ) | SL-reference signal received power (SL-RSRP) may be a received signal strength in the sidelink. The remote terminal may measure an SL-RSRP or an SL-reference signal received quality (SL-RSRQ) for a reference signal (e.g., sidelink discovery (SD)-RS, demodulation reference signal (DMRS), channel state information (CSI)-RS). |
| Access link (AL)-RSRP (or, AL-RSRQ) | AL-RSRP may be a received signal strength in the access link. The remote terminal operating in the RRC idle state or the RRC inactive state may measure an AL-RSRP and/or an AL-RSRQ for a reference signal (e.g., SD-RS, DMRS, CSI-RS) in a camping cell. Alternatively, the remote terminal operating in the RRC connected state may measure an AL-RSRP and/or an AL-RSRQ for a reference signal (e.g., SD-RS, DMRS, CSI-RS) in a primary cell (PCell). |

TABLE 6

| Configuration for RSRP measurement and evaluation | |
|---|---|
| SL-RSRP threshold (or, SL-RSRQ threshold) | An SL-RSRP threshold (q-RxLevMin) may be a reference value for determining a communication available service link. A service may be possible in a sidelink having an SL-RSRP equal to or greater than the SL-RSRP threshold. A sidelink having an SL-RSRP less than the SL-RSRP threshold may be switched to another link. |
| AL-RSRP threshold (or, AL-RSRQ threshold) | An AL-RSRP threshold may be a reference value for determining a communication available access link. A service may be possible in an access link having an AL-RSRP equal to or greater than the AL-RSRP threshold (e.g., an access link in a camping cell or a PCell of the remote terminal). An access link with an AL-RSRP below the AL-RSRP threshold may be switched to another link. |
| Hysteresis | A hysteresis value may be used in the measurement and/or evaluation of RSRP. When measuring the SL-RSRP, the remote terminal may determine a path switching in consideration of the corresponding hysteresis value. |
| L3 filtering values | L3 filtering values may be filter coefficients for measuring and/or evaluating the RSRP through L3 filtering. If the L3 filtering is not configured, the L3 filter-based measurement hysteresis (e.g., L3 filtering values) may not be considered after the RSRP measurement. |

TABLE 7

| Measurement report configuration | |
|---|---|
| Measurement reporting scheme | A measurement reporting scheme may indicate a scheme of reporting a measurement result. The measurement reporting scheme may be classified into 'timer-based reporting scheme' and 'event-based reporting scheme' |
| Timer setting value | A timer setting value may be used for the timer-based reporting scheme. The timer setting value may be a value for transmitting the RSRP measured by the remote terminal (e.g., periodically-measured RSRP). |

TABLE 8

| Path switching configuration | |
|---|---|
| Path switching decision scheme | A path switching decision scheme may indicate a decision subject of path switching (e.g., path configuration). The path switching decision scheme may be classified into 'base station decision-based path switching method' and 'terminal decision-based path switching method' |

Meanwhile, the remote terminal may perform a measurement operation based on the configuration information (e.g., measurement configuration information and/or path switching configuration information) received from the base station (S1703). The measurement operation may be performed on the sidelink and/or the access link. The remote terminal may transmit measurement information (e.g., measurement result) to the relay terminal and/or the base station. The measurement result may be RSRP, RSRQ, or the like. To support this operation, the remote terminal may use a measurement value derivation scheme configured in the step S1702. When a L3 filtering-based measurement operation is performed, the remote terminal may perform a measurement operation on a reference signal in a preconfigured time window (e.g., time interval) and derive an average value based on measurement results. The remote terminal may use weight coefficients (e.g., L3 filtering values) to set weights for an average value measured in the previous time window and an average value measured in the current time window. If the L3 filtering based measurement operation is not used, the remote terminal may use the average value of the measurement results in the time window.

When the terminal decision-based path switching method is used, a step S1704-1 may be performed. When the condition(s) configured in the step S1702 are satisfied, the remote terminal may determine to switch the communication path from the sidelink (i.e., PC5) to the access link (i.e., Uu) (S1704-1). For example, when an RSRP (or RSRQ) measured in the sidelink is less than the SL-RSRP threshold (or SL-RSRQ threshold) and/or when an RSRP (or RSRQ) measured in the access link is equal to or greater than the AL-RSRP threshold (or AL-RSRQ threshold), the remote terminal may determine to switch the communication path from the sidelink (i.e., PC5) to the access link (i.e., Uu).

When the base station decision-based path switching method is used, a step S1704-2 may be performed instead of the step S1704-1. The base station may determine whether to switch the communication path based on the information configured in the step S1702 and the measurement report (e.g., measurement result) received from the remote terminal (S1704-2). For example, when the RSRP (or RSRQ) measured in the sidelink is less than the SL-RSRP threshold (or SL-RSRQ threshold) and/or when the RSRP (or RSRQ) measured in the access link is equal to or greater than the AL-RSRP threshold (or, AL-RSRQ threshold), the base station may determine to switch the communication path from the sidelink (i.e., PC5) to the access link (i.e., Uu). Alternatively, the base station may not perform the path switching (e.g., path configuration) in consideration of a service configured in the remote terminal and/or a load level of the base station based on the information received in a step S1705.

The remote terminal may perform a path switching reporting procedure (e.g., path switching notification procedure) based on the measurement configuration information and/or the path switching configuration information received from the base station (S1705). For example, the remote terminal may transmit a path switching report message to the base station. The path switching report message may include different information depending on the subject of the path switching decision as follows.

When the terminal decision-based path switching method is used, the remote terminal may transmit a path switching report message including measurement result information, measurement target information, and/or path switching information to the base station. The path switching information may be transmitted in an RRC connection establishment procedure. Alternatively, the path switching information may be included in sidelink UE information message transmitted to the base station. The above-described message (e.g., information) may be delivered to the base station through the relay terminal.

When the base station decision-based path switching method is used, the remote terminal may perform a path switching report procedure based on the measurement configuration information and/or path switching configuration information received from the base station. The path switching operation may be performed based on a result of the measurement operation performed in the remote terminal. The path switching operation may be performed as follows.

Timer-based reporting scheme: Based on a timer, the remote terminal may report the SL-RSRP and/or a terminal identifier (e.g., identifier of the remote terminal and/or relay terminal) in the corresponding sidelink to the base station.

Event-based reporting scheme: Based on an event, the remote terminal may report the SL-RSRP and/or a terminal identifier (e.g., identifier of the remote terminal and/or relay terminal) in the corresponding sidelink to the base station.

When the timer-based reporting scheme is used, the remote terminal may periodically report measurement results to the base station according to a timer value set in the step S1702. Here, the measurement result may be transmitted in the step S1705. When the event-based reporting scheme is used, the remote terminal may report the measurement result to the base station when the measurement result satisfies the condition(s) configured in the step S1702 (e.g., when a reporting event occurs). Here, the measurement result may be transmitted in the step S1705.

For example, if there is a sidelink having an SL-RSRP less than the SL-RSRP threshold configured in the step S1702 (or, if there is a sidelink having an SL-RSRP equal to or greater than the SL-RSRP threshold configured in the step S1702), the remote terminal may report the measurement result and/or the terminal identifier in the corresponding sidelink to the base station. The information reported to the base station (e.g., path switching report) may be included in the measurement report message or the sidelink UE information message transmitted to the base station. The measurement report message may be an RRC message. The above-described message(s) may be delivered to the base station through the relay terminal.

The path switching from the sidelink to the access link may be determined according to the step S1705. In this case, an RRC connection reconfiguration procedure for path configuration (e.g., path switching) between the base station and the remote terminal may be performed. To support this operation, an RRC reconfiguration message and/or an RRC reconfiguration complete message may be used. The base station may transmit an RRC reconfiguration message for the path switching, and the remote terminal may receive the RRC reconfiguration message for the path switching from the base station. In this case, the remote terminal may perform a random access procedure using uplink radio resources configured by the base station, and may receive allocation information of uplink radio resources for data transmission from the base station. The RRC reconfiguration message for the above-described procedure may be transmitted from the base station to the remote terminal through the relay terminal. The RRC reconfiguration complete message may be transmitted from the remote terminal to the base station through the relay terminal. Alternatively, the RRC reconfiguration complete message may be transmitted to the base station using the uplink radio resources allocated by the random access procedure.

When the path switching operation is performed, in order to perform the path switching without data loss for a radio bearer configured in an RLC acknowledged mode (AM), the following items may be considered. In a transmission procedure of PDCP data between the base station and the remote terminal, RLC packet data unit (PDU) transmission may be performed through a plurality of hops between the base station and the relay terminal or a plurality of hops between the relay terminal and the remote terminal. In this case, when the path switching is performed while the transmitting terminal does not receive an acknowledgment message for the RLC PDU (i.e., the RLC PDU transmitted from the transmitting terminal), the corresponding RLC PDU may be lost.

Figure 18:
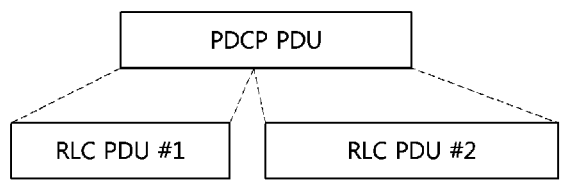
FIG. 18 is a conceptual diagram illustrating a first exemplary embodiment of a method for transmitting an RLC PDU in a relay communication system.

FIG. 18 is a conceptual diagram illustrating a first exemplary embodiment of a method for transmitting an RLC PDU in a relay communication system.

As shown in FIG. 18, an RLC PDU may be transmitted using a relay terminal. The PDCP PDU may be divided into a plurality of RLC PDUs (e.g., RLC PDU #1 and RLC PDU #2), and the plurality of divided RLC PDUs may be transmitted.

Figure 19:
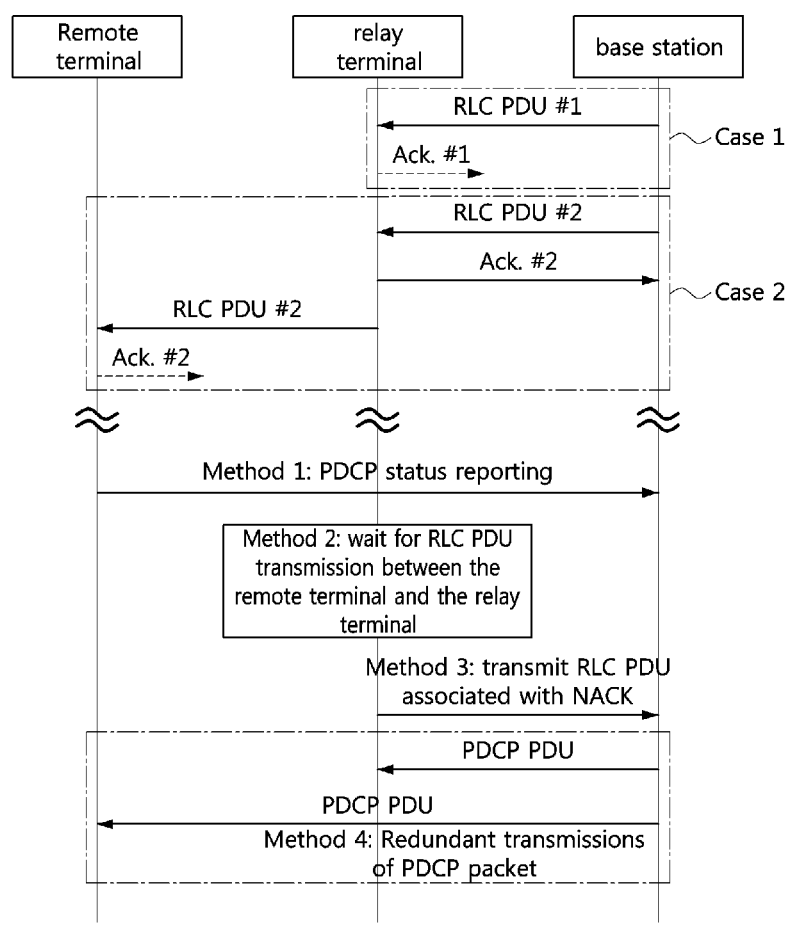
FIG. 19 is a sequence chart illustrating a first exemplary embodiment of a path switching method without data loss in a relay communication system.

FIG. 19 is a sequence chart illustrating a first exemplary embodiment of a path switching method without data loss in a relay communication system.

The exemplary embodiment shown in FIG. 19 may be a method for solving a problem that occurs when a plurality of divided RLC PDUs are transmitted through one or more hops between a base station and a relay terminal or one or more hops between a relay terminal and a remote terminal.

As shown in FIG. 19, a case 1 may be a case in which an acknowledgment (i.e., Ack. #1) for an RLC PDU #1 is not received by the base station. In the case 1, the relay terminal may not receive the RLC PDU #1. A case 2 may be a case in which an acknowledgment (i.e., Ack. #2) for an RLC PDU #2 is not received by the relay terminal. In the case 2, the remote terminal may not receive the RLC PDU #2. In the case 1, even when the path is switched to the path of the base station (e.g., access link), the above-described problem (e.g., data loss) may not occur because the retransmission operation is performed by the base station. In the case 2, when the sidelink is switched to the access link, the base station may not identify whether the RLC PDU #2 has been transmitted (or received). In this case, the method(s) below may be considered.

Method 1: After the sidelink is switched to the access link, an operation of exchanging a PDCP status report message between the remote terminal and the base station may be performed. For example, in the step S1706 shown in FIG. 17, the RRC layer of the remote terminal may instruct to transmit a PDCP status report message to the base station, and accordingly, the remote terminal may transmit the PDCP status report message to the base station. The base station may receive the PDCP status report message from the remote terminal, and may identify a PDCP PDU that has not been received at the remote terminal based on information included in the PDCP status report message. The base station may retransmit the corresponding PDCP PDU to the remote terminal. The PDCP status report message may include a bitmap indicating the PDCP PDU (e.g., a sequence number (SN) of the PDCP PDU) that has not been received at the remote terminal. That is, the retransmission operation may be performed on a PDCP PDU basis.

In order to support the above-described operation, the PDCP layer may perform a buffering operation for data during a specific time period for retransmission of the PDCP PDU indicated by the PDCP status report message under control of the base station. The buffered data may be retransmitted based on the bitmap included in the PDCP status report message. In order to control the buffering operation of the PDCP data (e.g., PDCP PDU), the base station may configure a buffering start time and/or a buffering end time of the PDCP data through a control protocol procedure or timer configuration.

Method 2: The relay terminal may receive an acknowledgment message for an RLC PDU from the remote terminal. In this case, the relay terminal may transmit the corresponding information (e.g., acknowledgment information) to the base station, and then switch the path. To support this operation, the relay terminal may use an RRC reconfiguration-related message (e.g., RRC reconfiguration message, RRC reconfiguration complete message) transmitted from the remote terminal to the base station to transmit the corresponding information (e.g., acknowledgment information) to the base station. Alternatively, the relay terminal may define a new message and transmit the new message including the corresponding information (e.g., acknowledgment information) to the base station.

Method 3: The relay terminal may not receive an acknowledgment message for an RLC PDU from the remote terminal. In this case, the relay terminal may perform a path switching procedure. In the path switching procedure, the relay terminal may transmit the RLC PDU not received by the remote terminal and/or a negative ACK (NACK) to the base station. To support this operation, the relay terminal may use an RRC reconfiguration-related message transmitted from the remote terminal to the base station to transmit the RLC PDU, information of the RLC PDU (e.g., SN), and/or reception failure information (e.g., NACK) to the base station.

Method 4: The remote terminal may support a radio frequency (RF) and/or protocol operation for dual connectivity. In this case, in a path switching procedure, the base station may transmit a PDCP PDU through dual connections. That is, the PDCP packet (e.g., PDCP PDU) may be transmitted redundantly. When the path switching is complete, the dual connections may be switched to a single connection. To support this operation, the base station may control the redundant packet transmission through a control protocol procedure and/or timer configuration. The data (e.g., PDCP PDU) in a period configured for the redundant packet transmission may be simultaneously transmitted using the sidelink and the access link.

The RRC reconfiguration message and/or the RRC reconfiguration complete message may be delivered to the base station through the relay node.

Referring back to FIG. 17, the base station may perform a UE context modification procedure (S1707). The UE context modification procedure may be performed between the base station and a control plane entity located in the core network. In the step S1707, it may be known to the node of the core network that a data flow configured by the core network is transmitted without passing through the relay terminal, and a relationship between the remote terminal and the relay terminal and/or context information related to the data flow may be updated.

After the path of the remote terminal is switched from the sidelink (i.e., PC5) to the access link (i.e., Uu), the base station may perform an RRC connection reconfiguration procedure to release a radio bearer and/or radio resources configured in the relay terminal (S1708). In the step S1708, the base station may release a signaling radio bearer (SRB) and/or a data radio bearer (DRB) configured for data transmission of the remote terminal. The remote terminal may perform a data transmission/reception operation with the base station using the switched path (e.g., access link) (S1709).

[Path Switching Method from Access Link (Uu) to Sidelink (PC5)]

Figure 20:
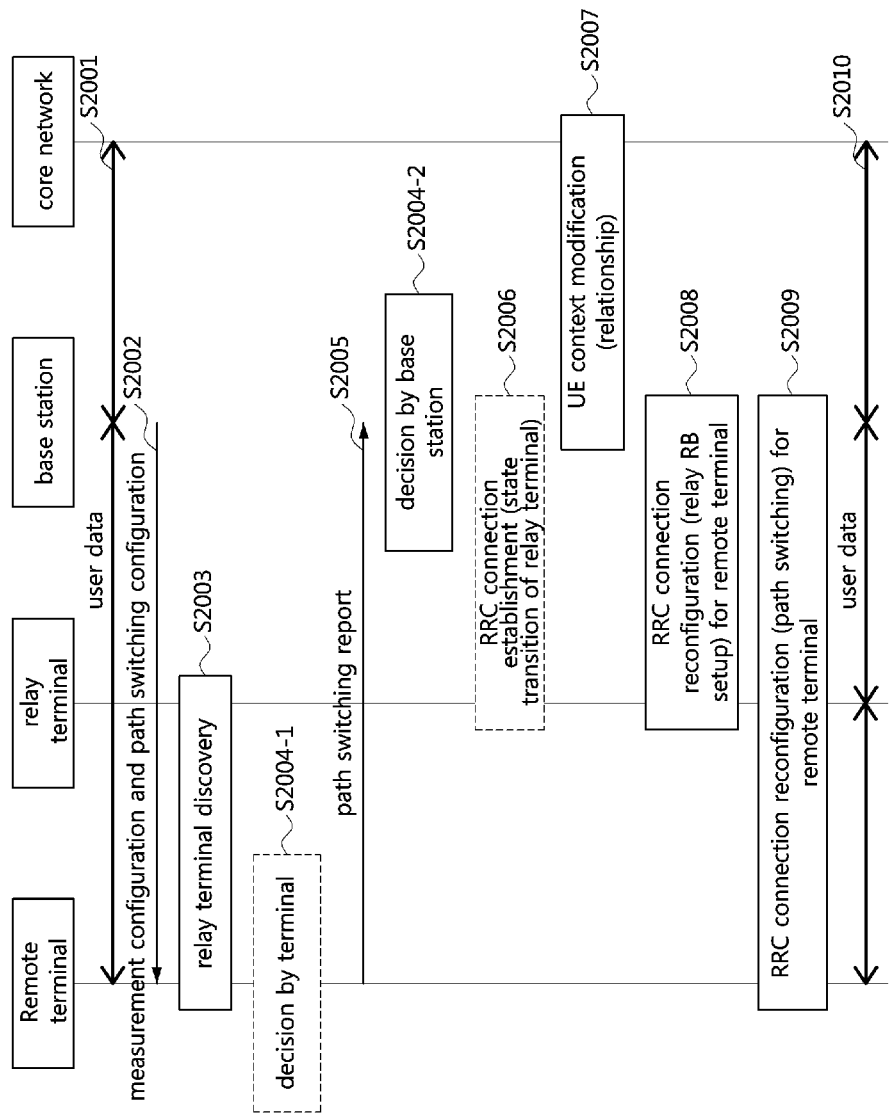
FIG. 20 is a sequence chart illustrating a first exemplary embodiment of a path switching method from an access link to a sidelink in a relay communication system.

FIG. 20 is a sequence chart illustrating a first exemplary embodiment of a path switching method from an access link to a sidelink in a relay communication system.

As shown in FIG. 20, a remote terminal may transmit and receive data with a base station using an access link (S2001). The base station may transmit measurement configuration information and/or path switching configuration information to the remote terminal (S2002). The measurement configuration information and/or the path switching configuration information may instruct the remote terminal to perform a measurement operation on the sidelink and/or the access link. Each of the measurement configuration information and the path switching configuration information may be transmit through a combination of one or more of a higher layer message (e.g., system information, RRC message), a MAC message (e.g., MAC CE), and a PHY message (e.g., DCI). The measurement configuration information and/or path switching configuration information may include the parameter(s) defined in Tables 5 to 8. Since the remote terminal needs to perform a discovery operation for a neighboring terminal (e.g., relay terminal), the remote terminal may use terminal discovery configuration information included in a dedicated signaling message and/or broadcast message (e.g., system information, RRC message).

The remote terminal may perform a measurement operation and/or a terminal discovery operation using the configuration information (e.g., measurement configuration information, path switching configuration information, and/or terminal discovery configuration information) obtained in the step S2002 (S2003). The remote terminal may transmit a result of performing the step S2003 (e.g., measurement result and/or discovery result) to the relay terminal and/or the base station. When the terminal decision-based path switching method is used, a step S2004-1 may be performed. The remote terminal may determine to switch the communication path from the access link (i.e., Uu) to the sidelink (i.e., PC5) based on the configuration information obtained in the step S2002 and the result of the step S2003 (e.g., measurement result and/or discovery result) (S2004-1). For example, when an RSRP (or RSRQ) measured in the sidelink is equal to or greater than the SL-RSRP threshold (or SL-RSRQ threshold) and/or when an RSRP (or RSRQ) measured in the access link is less than the AL-RSRP threshold (or AL-RSRQ threshold), the remote terminal may determine to switch the communication path from the access link (i.e., Uu) to the sidelink (i.e., PC5).

When the base station decision-based path switching method is used, a step S2004-2 may be performed instead of the step S2004-1. The base station may determine whether to switch the communication path based on the information configured in the step S2002 and the measurement/discovery report (e.g., measurement result and/or discovery result) received from the remote terminal (S2004-2). For example, when the RSRP (or RSRQ) measured in the sidelink is equal to or greater than the SL-RSRP threshold (or SL-RSRQ threshold) and/or when the RSRP (or RSRQ) measured in the access link is less than the AL-RSRP threshold (or, AL-RSRQ threshold), the base station may determine to switch the communication path from the access link (i.e., Uu) to the sidelink (i.e., PC5). Alternatively, the base station may not perform the path switching (e.g., path configuration) in consideration of a service configured in the remote terminal and/or a load level of the base station based on the information received in the step S2005.

The remote terminal may perform a path switching reporting procedure based on the measurement configuration information and/or the path switching configuration information received from the base station (S2005). For example, the remote terminal may transmit a path switching report message to the base station. The path switching report may include different information depending on the subject of the path switching decision. The step S2005 may be performed in the same or similar manner as the step S1705 shown in FIG. 17.

When the terminal decision-based path switching method is used, the remote terminal may transmit a path switching report message including measurement result information, measurement target information, and/or path switching information to the base station. The path switching information may be transmitted in an RRC connection establishment procedure. Alternatively, the path switching information may be included in sidelink UE information message transmitted to the base station. The above-described message (e.g., information) may be delivered to the base station via the relay terminal.

When the base station decision-based path switching method is used, the remote terminal may perform a path switching report procedure based on the measurement configuration information and/or path switching configuration information received from the base station. The path switching operation may be performed based on a result of the measurement operation performed in the remote terminal.

If the relay terminal (e.g., terminal performing a relay function) discovered in the step S2003 operates in an RRC idle state or an RRC inactive state, the relay terminal may perform an RRC connection establishment procedure with the base station to transition to an RRC connected state (S2006). For example, the relay terminal (e.g., terminal discovered by the remote terminal) may acquire downlink synchronization of the base station, and then perform a random access procedure, thereby receiving allocation information of uplink radio resources for data transmission from the base station. The relay terminal may exchange an RRC connection configuration request message, an RRC connection configuration message, and/or an RRC connection configuration complete message with the base station to perform a UE context generation operation and a state transition operation (e.g., 'RRC idle state→RRC connected state' or 'RRC inactive state→RRC connected state'). When the relay terminal operates in the RRC connected state, the step S2006 may be omitted.

The base station may perform a UE context modification procedure (S2007). The UE context modification procedure may be performed between the base station and a control plane entity located in the core network. In the step S2007, it may be known to the node of the core network that a data flow configured by the core network is transmitted without passing through the relay terminal, and a relationship between the remote terminal and the relay terminal and/or context information related to the data flow may be updated.

If the operating state of the relay terminal after the step S2005 is the RRC connected state, the base station may perform an RRC connection reconfiguration procedure with the relay terminal in order to configure a relay path (e.g., sidelink-access link) and/or a bearer for data transmission of the remote terminal (S2008). For this operation, an RRC reconfiguration message and/or an RRC reconfiguration complete message may be used. The relay path may be referred to as a relay link.

When it is determined that the path is switched from the access link to the sidelink, the base station may perform an RRC connection reconfiguration procedure with the remote terminal to configure a path for the remote terminal (S2009). For this operation, an RRC reconfiguration message and/or an RRC reconfiguration complete message may be used. When the RRC reconfiguration message for path switching is received, the remote terminal may transmit and receive data with the base station through the relay link by performing direct communication (e.g., sidelink communication) with the relay terminal.

When the path of the remote terminal is switched from the access link (i.e., Uu) to the sidelink (i.e., PC5), the base station may transmit a message instructing to release the bearer configured for the remote terminal in the RRC connection reconfiguration procedure. The remote terminal may receive the message instructing release of the bearer configuration, and release the SRB and/or DRB configured for the access link. The remote terminal may transmit and receive data to and from the base station through the relay terminal (e.g., relay link) (S2010).

[Path Switching Method from a First Sidelink (PC5) to a Second Sidelink (PC5)]

Figure 21:
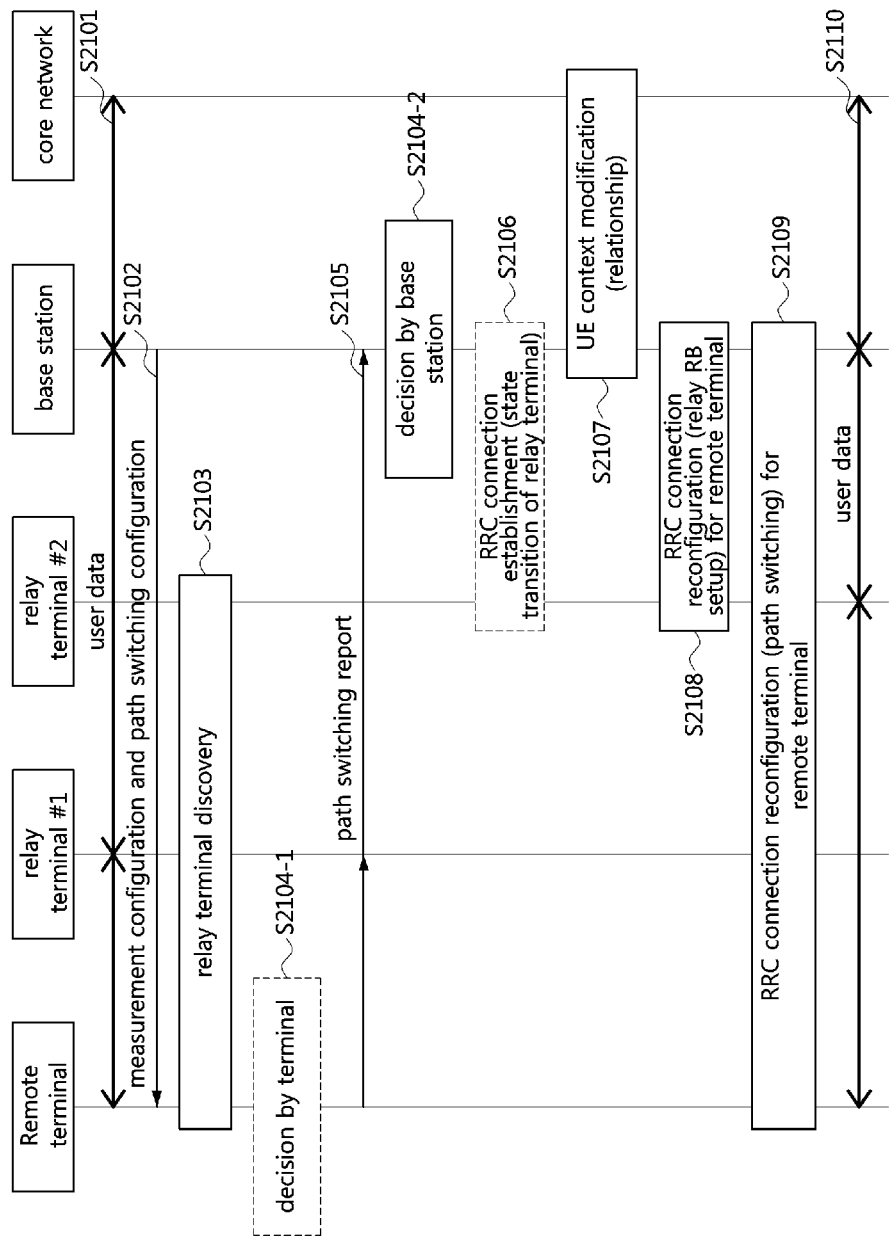
FIG. 21 is a sequence chart illustrating a first exemplary embodiment of a path switching method from a first sidelink to a second sidelink in a relay communication system.

FIG. 21 is a sequence chart illustrating a first exemplary embodiment of a path switching method from a first sidelink to a second sidelink in a relay communication system.

As shown in FIG. 21, a remote terminal may transmit and receive data to and from a base station through a relay terminal #1 (e.g., relay link) (S2101). The base station may transmit measurement configuration information and/or path switching configuration information to the remote terminal (S2102). The measurement configuration information and/or the path switching configuration information may instruct the remote terminal to perform a measurement operation on the sidelink and/or the access link. In addition, terminal discovery configuration information in the step S2102 may be transmitted from the base station to the remote terminal.

Each of the measurement configuration information and the path switching configuration information may be transmitted through a combination of one or more of a higher layer message (e.g., system information, RRC message), a MAC message (e.g., MAC CE), and a PHY message (e.g., DCI). The measurement configuration information and/or path switching configuration information may include parameter(s) defined in Tables 5 to 8.

The remote terminal may perform a measurement operation and/or a terminal discovery operation using the configuration information (e.g., measurement configuration information, path switching configuration information, and/or terminal discovery configuration information) obtained in the step S2102 (S2103). The remote terminal may transmit a result of performing the step S2103 (e.g., measurement result and/or discovery result) to the relay terminal and/or the base station.

When the terminal decision-based path switching method is used, a step S2104-1 may be performed. The remote terminal may determine to switch the communication path from a first sidelink (e.g., sidelink between the remote terminal and the relay terminal #1) to a second sidelink (e.g., sidelink between the remoted terminal and a relay terminal #2) based on the configuration information obtained in the step S2102 and the result of the step S2103 (e.g., measurement result and/or discovery result) (S2104-1). For example, when an RSRP (or RSRQ) measured in the first sidelink is less than the SL-RSRP threshold (or SL-RSRQ threshold) and/or when an RSRP (or RSRQ) measured in the second sidelink is equal to or greater than the AL-RSRP threshold (or AL-RSRQ threshold), the remote terminal may determine to switch the communication path from the first sidelink to the second sidelink.

When the base station decision-based path switching method is used, a step S2104-2 may be performed instead of the step S2104-1. The base station may determine whether to switch the communication path based on the information configured in the step S2102 and the measurement/discovery report (e.g., measurement result and/or discovery result) received from the remote terminal (S2104-2). For example, when the RSRP (or RSRQ) measured in the first sidelink is less than the SL-RSRP threshold (or SL-RSRQ threshold) and/or when the RSRP (or RSRQ) measured in the second sidelink is equal to or greater than the AL-RSRP threshold (or, AL-RSRQ threshold), the base station may determine to switch the communication path from the first sidelink to the second sidelink. Alternatively, the base station may not perform the path switching (e.g., path configuration) in consideration of a service configured in the remote terminal and/or a load level of the base station based on the information received in the step S2105.

The remote terminal may perform a path switching reporting procedure based on the measurement configuration information and/or the path switching configuration information received from the base station (S2105). The step S2105 may be performed in the same or similar as the step S2005 shown in FIG. 20.

When the relay terminal #2 (e.g., terminal performing a relay function) discovered in the step S2103 operates in an RRC idle state or an RRC inactive state, the relay terminal #2 may perform an RRC connection establishment procedure with the base station, thereby transitioning to an RRC connected state (S2106). When the relay terminal #2 operates in the RRC connected state, the step S2106 may be omitted. The step S2106 may be performed in the same or similar as the step S2006 shown in FIG. 20.

The base station may perform a UE context modification procedure (S2107). The step S2107 may be performed in the same or similar as the step S2007 shown in FIG. 20. If the operating state of the relay terminal #2 after the step S2105 is the RRC connected state, the base station may perform an RRC connection reconfiguration procedure with the relay terminal #2 in order to configure a relay path (e.g., sidelink-access link) and/or a bearer for data transmission of the remote terminal (S2108). The step S2108 may be performed in the same or similar as the step S2008 shown in FIG. 20.

When it is determined that the path is switched from the first sidelink to the second sidelink, the base station may perform an RRC connection reconfiguration procedure with the remote terminal to configure a path for the remote terminal (S2009). For this operation, an RRC reconfiguration message and/or an RRC reconfiguration complete message may be used. When the RRC reconfiguration message for path switching is received, the remote terminal may transmit and receive data with the base station through the relay link by performing direct communication (e.g., sidelink communication) with the relay terminal #2.

When the path of the remote terminal is switched from the first sidelink to the second sidelink, the base station may transmit a message instructing to release the bearer configured for the relay terminal #1 in the RRC connection reconfiguration procedure. The remote terminal may receive the message instructing release of the bearer configuration, and release the SRB and/or DRB configured for the relay terminal #1. The remote terminal may transmit and receive data to and from the base station through the relay terminal #2 (e.g., relay link) (S2110).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method performed by a remote terminal in a communication system, the operation method comprising:
    performing communication with a base station using an access link between the remote terminal and the base station;
    receiving configuration information for discovery and selection of a relay terminal from the base station, wherein the configuration information includes measurement object information indicating a measurement target signal for discovering the relay terminal;
    determining to perform a discovery operation for discovering the relay terminal when a state of the access link satisfies a condition;
    receiving a first signal from each of at least one of neighboring terminals, wherein a measurement operation on the first signal is not performed when the first signal is not the measurement target signal;
    receiving a second signal from each of one or more neighboring terminals;
    performing a measurement operation on the second signal when the second signal is the measurement target signal;
    determining at least one candidate terminal from among the one or more neighboring terminals based on a result of the measurement operation on the second signal;
    selecting the relay terminal within the at least one candidate terminal;
    configuring a sidelink between the remote terminal and the relay terminal by performing a sidelink setup procedure with the relay terminal; and
    performing sidelink communication with the relay terminal connected to the base station using the sidelink instead of the access link.

2. The operation method according to claim 1, further comprising:
    transitioning an operating state of the remote terminal to a sidelink (SD) connected state when the sidelink setup procedure is completed,
    wherein the sidelink communication is performed by the remote terminal operating in the SD connected state.

3. The operation method according to claim 1, wherein the first signal is a synchronization signal and the second signal is a discovery signal.

4. The operation method according to claim 1, wherein the configuration information further includes one or more of configuration information for a beam sweeping operation, configuration information of a resource pool for the discovery operation, configuration information of a frequency for the discovery operation, or configuration information of a public land mobile network (PLMN) for the discovery operation.

5. The operation method according to claim 1, further comprising performing a beam sweeping operation with the one or more neighboring terminals, wherein the second signal is received through a beam configured in the beam sweeping operation.

6. The operation method according to claim 1, wherein the second signal includes information indicating whether each of the one or more neighboring terminals supports a relay function.

7. The operation method according to claim 3, wherein the discovery signal is one or more of a demodulation reference signal (DMRS) or a sidelink discovery-reference signal (SD-RS).

8. The operation method according to claim 1, further comprising transmitting a response signal to the second signal to the one or more neighboring terminals.

9. An operation method performed by a remote terminal in a communication system, the operation method comprising:
    performing communication with a base station using an access link between the remote terminal and the base station;
    receiving configuration information for discovery and selection of a relay terminal from the base station, wherein the configuration information includes measurement object information indicating a measurement target signal for discovering the relay terminal-;
    determining to perform a discovery operation for discovering the relay terminal when a state of the access link satisfies a condition;
    receiving a first signal from each of at least one of neighboring terminals, wherein a measurement operation on the first signal is not performed when the first signal is not the measurement target signal;
    receiving a second signal from each of one or more neighboring terminals;
    performing a measurement operation on the second signal when the second signal is the measurement target signal;
    determining at least one candidate terminal from among the one or more neighboring terminals based on a result of the measurement operation on the second signal;
    transmitting a list including information of the at least one candidate terminal to the base station; and
    receiving information on the relay terminal selected within the at least one candidate terminal included in the list from the base station.

10. The operation method according to claim 9, further comprising:
    configuring a sidelink between the remote terminal and the relay terminal by performing a sidelink setup procedure with the relay terminal selected by the base station;
    transitioning an operating state of the remote terminal to a sidelink (SD) connected state when the sidelink setup procedure is completed; and
    performing sidelink communication with the relay terminal connected to the base station using the sidelink instead of the access link.

11. The operation method according to claim 9, wherein the information on the relay terminal is included in a radio resource control (RRC) connection reconfiguration message transmitted from the base station.

12. The operation method according to claim 9, wherein the configuration information further includes one or more of configuration information for a beam sweeping operation, configuration information of a resource pool for the discovery operation, configuration information of a frequency for the discovery operation, or configuration information of a public land mobile network (PLMN) for the discovery operation.

13. The operation method according to claim 9, further comprising performing a beam sweeping operation with the one or more neighboring terminals, wherein the second signal is received through a beam configured in the beam sweeping operation.

14. The operation method according to claim 9, wherein the first signal is a synchronization signal, the second signal is a discovery signal, the discovery signal includes information indicating whether each of the one or more neighboring terminals supports a relay function, and the discovery signal is one or more of a demodulation reference signal (DMRS) or a sidelink discovery-reference signal (SD-RS).

* * * * *